US011472074B2

(12) United States Patent
Göbel

(10) Patent No.: US 11,472,074 B2
(45) Date of Patent: Oct. 18, 2022

(54) METHOD FOR PRODUCING A CONTAINER

(71) Applicant: ADVAL TECH HOLDING AG, Niederwangen (CH)

(72) Inventor: Markus Göbel, Hochdorf (CH)

(73) Assignee: ADVAL TECH HOLDING AG, Niederwangen (CH)

( * ) Notice: Subject to any disclaimer, the term of this patent is extended or adjusted under 35 U.S.C. 154(b) by 590 days.

(21) Appl. No.: 16/462,368

(22) PCT Filed: Nov. 13, 2017

(86) PCT No.: PCT/EP2017/078977
§ 371 (c)(1),
(2) Date: May 20, 2019

(87) PCT Pub. No.: WO2018/095747
PCT Pub. Date: May 31, 2018

(65) Prior Publication Data
US 2019/0337202 A1 Nov. 7, 2019

(30) Foreign Application Priority Data

Nov. 22, 2016 (EP) .................................... 16199999
Mar. 10, 2017 (EP) .................................... 17160247

(51) Int. Cl.
*B29C 45/00* (2006.01)
*B29K 23/00* (2006.01)
(Continued)

(52) U.S. Cl.
CPC ...... *B29C 45/0062* (2013.01); *B29C 45/0001* (2013.01); *B29C 2045/0063* (2013.01);
(Continued)

(58) Field of Classification Search
CPC . B29C 45/0062; B29C 45/0001; B29C 45/00; B29C 2045/006; B29K 2023/065;
(Continued)

(56) References Cited

U.S. PATENT DOCUMENTS 6,117,380 A 9/2000 Shirai et al.
2002/0027098 A1 3/2002 Takemoto et al.
(Continued)

FOREIGN PATENT DOCUMENTS

CN 101267927 A 9/2008
DE 41 26 041 A1 2/1992
(Continued)

OTHER PUBLICATIONS

International Search Report for PCT/EP2017/078977 dated Jan. 23, 2018 [PCT/ISA/210].

*Primary Examiner* — Jeffrey M Wollschlager
*Assistant Examiner* — Xue H Liu
(74) *Attorney, Agent, or Firm* — Sughrue Mion, PLLC

(57) ABSTRACT

A method for producing a thermoplastic container (1) for gases or liquids. First, in an injection mould having a first (28) and a second mould (29), in a first position providing each a cavity (34) for an upper (2) and a lower shell (3), producing the shells in parallel. Next, opening the mould, the shells (2, 3) remaining in a respective mould. Then, turning or shifting at least one of the two moulds such that the concave interior sides of the shells are aligned against each other and closing the mould, so that the edge regions (7, 8) of the shells come into face-to-face contact. Injection material is injected into a cavity (49) between or adjacent to the edge areas (7, 8), forming an all-round welded seam (11) between the upper part (2) and the lower part (3). Finally the mould is opened and the at least one container is removed.

19 Claims, 20 Drawing Sheets

(51) Int. Cl.
 *B29K 309/08* (2006.01)
 *B29L 31/00* (2006.01)

(52) U.S. Cl.
 CPC .... *B29K 2023/065* (2013.01); *B29K 2023/12* (2013.01); *B29K 2309/08* (2013.01); *B29L 2031/712* (2013.01)

(58) Field of Classification Search
 CPC ............ B29K 2023/12; B29K 2309/08; B28K 2031/712; B28K 2031/7172
 USPC ........................................................ 264/255
 See application file for complete search history.

(56) References Cited

U.S. PATENT DOCUMENTS

| | | |
|---|---|---|
| 2006/0118358 A1 | 6/2006 | Vollrath et al. |
| 2007/0210469 A1 | 9/2007 | Iimura et al. |
| 2015/0258887 A1 | 9/2015 | Sun et al. |

FOREIGN PATENT DOCUMENTS

| | | |
|---|---|---|
| DE | 198 52 553 A1 | 6/1999 |
| DE | 20 2011 000 201 U1 | 10/2011 |
| EP | 1 440 786 A1 | 7/2004 |
| FR | 2 848 496 A1 | 6/2004 |
| JP | 4-246520 A | 9/1992 |
| JP | 6-182806 A | 7/1994 |
| JP | 6-246781 A | 9/1994 |
| JP | 8-323822 A | 12/1996 |
| JP | 2001-38768 A | 2/2001 |
| JP | 2001-038768 A | 2/2001 |
| JP | 2001-272109 A | 10/2001 |
| WO | 2015/051271 A1 | 4/2015 | ized by this method.

METHOD FOR PRODUCING A CONTAINER

CROSS REFERENCE TO RELATED APPLICATIONS

This application is a National Stage of International Application No. PCT/EP2017/078977, filed on Nov. 13, 2017, which claims priority from European Patent Application No. 16199999.0, filed on Nov. 22, 2016, and European Patent Application No. 17160247.7, filed on Mar. 10, 2017.

TECHNICAL FIELD

The present invention relates to a method for producing a container, in particular as a liquid container in the automotive field, a device for producing such a container and containers produced using this method and uses of such containers.

PRIOR ART

Containers which do not have to withstand a particular pressure load and which need to be comparatively freely designed can be produced in a blow molding method. However, this method is not particularly flexible in terms of design options, which is why, for example, in vehicles, containers for liquids and gases are generally containers composed of two half shells. The two half shells are manufactured individually from a thermoplastic plastics material in a respective injection molding process and the half shells are subsequently welded to one another. This welding can take place, for example, in a hot plate method, wherein a hot plate is placed between the two half shells so that the thermoplastic material liquefies or at least softens in the edge region, the hot plate is subsequently quickly withdrawn from the clearance and the two half shells are pressed against one another.

This process is firstly problematic in that it requires a plurality of different handling steps for the individually produced components. Furthermore, containers produced in this way exhibit problems associated with warping and there are not many design options in terms of the shape of the container. Finally, the mechanical strength and leak-tightness of the generated weld seam cannot be ensured without significant effort.

PRESENTATION OF THE INVENTION

Accordingly, an object of the invention is to provide an improved production method for containers which are produced from a thermoplastic plastics material. A further object is to provide an injection molding machine which enables such a method to be carried out.

A further object is to provide improved containers using this method and uses of such containers.

Accordingly, according to a first aspect, the present invention relates to a method for producing a substantially closed container for carrying and/or storing gases and/or liquids which is made from a thermoplastic plastics material. The method has the following steps, preferably in the prescribed sequence:

1. in an injection mold having a first mold and a second mold, which, in a first injection molding position, together provides at least one cavity for an upper shell as well as at least one cavity for a lower shell, at least one upper shell and at least one lower shell are produced in parallel in an injection molding method;

2. opening the injection mold, wherein the at least one upper shell remains in the first mold and the at least one lower shell remains in the second mold;

3. rotating and/or displacing at least one of the two molds so that, after the rotation and/or displacement, the concave inner sides of the shells are directed towards one another and closing the mold to realize a second injection molding position, so that the substantially congruent edge regions of the shells come into at least partial planar contact;

4. injecting injection molding material into a cavity between or adjoining the edge regions to form a circumferential weld seam between the upper part and lower part;

5. opening the injection mold and removing the at least one container.

By producing the upper shell and lower shell simultaneously in the same mold and connecting the upper shell and lower shell using the same mold, which connection is enabled immediately after production by rotating the mold, the container can be produced in an extremely efficient and stable process with good positioning accuracy. The weld seam is therefore produced in the same tool without intermediary handling of the previously produced upper shell and lower shell so that a mechanically very stable and tight connection between the two half shells is ensured. The same material is preferably used for the two half shells and for the weld seam, so that the use and storage of the material is also optimized by this method.

In particular when the upper shell and lower shell are not formed identically, an injection mold which has a stepped parting plane is preferentially used in the method. A stepped parting plane is understood to be a parting plane of the mold in which, relative to the closing direction, the parting plane in the region of the mold for producing the upper shell of the mold in the first injection molding position is located at a different height from the parting plane in the region of the mold for producing the lower shell. This is so that, in the second injection molding position, in which the one half of the mold for producing the upper shell comes to lie opposite the one half of the mold for producing the lower shell (notably those mold regions in which the newly produced upper shell and lower shell do not remain during the transition from the first injection molding position to the second injection molding position—i.e. the mold regions which are consequently empty, i.e. the convex mold regions—come to lie opposite one another), and these two mold regions are not active, these two non-active mold regions are prevented from colliding. Specifically, at the end of the first injection molding phase, the two newly produced half shells are each held in that concave region of the respective mold which defines the outer surface of the respective half shells. In other words, the convex region of the respective mold, which defines the inner surface of the respective half shells, is removed from the interior of the respective newly produced half shells. Those regions of the mold which form the concave inner surface of the respective half shells on the inside, and which are in turn convexly formed as a molding contour, are not active in the second injection molding position and must accordingly also not collide.

If, for example, a mold with a region for producing an upper shell and a region for producing a lower shell is used, and the one mold is rotated in each case through 180°, for example, or relatively displaced by the distance between the molds for the second injection molding position, the parting plane of that region of the mold for the lower shell in which the produced lower shell remains in the second injection molding position is preferably arranged such that, in the first injection molding position, the parting plane of this region is arranged further forward in the closing direction. This means that, in the closing direction, that region of the mold for the lower shell in which the produced lower shell does not remain in the second injection molding position is sufficiently removed from that region of the mold of the upper shell in which the produced lower shell does not remain in the second injection molding position.

Owing to the stepped parting plane in two different injection molding positions, the corresponding mold or the injection molding machine carrying the mold must be capable of building up the necessary closing force in these two different positions, i.e. at two different heights relative to the flow direction. In the two positions, i.e. in the position in which the first injection molding position is assumed, and in the position in which the second injection molding position is assumed, the machine should always be capable of building up the necessary high closing force. Typically, a closing force of at least 200 t, preferably of at least 500 t is required. In many cases, closing forces of 600-3000 t are needed for the injection molding process. The machine should accordingly be capable of applying such closing forces in both positions over the course of the method.

A further preferred embodiment of the method is accordingly characterized in that the position of the first mold relative to the second mold, as seen in the closing direction, is arranged at a different height in the first injection molding position than in the second injection molding position.

A further preferred embodiment of the method is characterized in that a closing force in the range of 300-3000 t, preferably in the range of 400-2000 t, in particular in the range of 500-1000 t, is built up both in the first injection molding position and in the second injection molding position.

Within the context of carrying out the method cyclically, this step series can be followed by the following step:
6. rotating and/or displacing at least one of the two molds so that a first injection molding position is in turn assumed, which provides at least one cavity for an upper shell and at least one cavity for a lower shell, and cyclically repeating the step sequence to produce a plurality of containers.

In this case, the injection mold is preferably designed for simultaneous production of a container. In this case, the rotation of one of the two molds through 180°, or a displacement by the amount of offset of the two molds for the two half shells, takes place. However, it is also possible to carry out a plurality of such processes in the same mold; it is therefore possible to design the injection mold for the simultaneous production of n containers and the rotation (or analogously displacement) of one of the two molds then takes place through an angle of 360°/2n. The different molds are therefore distributed around the circumference. Furthermore, it is also possible to arrange several molds radially adjacent to one another; the rotational symmetry and rotations which are then required will be decided by the person skilled in the art with the general expertise.

According to a first preferred embodiment, the upper part and lower part each have a concave inner side and a convex outer side.

According to a further preferred embodiment, the edge regions of the upper part and lower part each have a circumferential, preferably outwardly directed flange.

In the contact surface of at least one of the flanges, preferably both flanges, which faces the other flange in each case, a circumferential channel is preferably provided so that, when the flanges of the upper part and lower part are in planar contact, a cavity is formed into which thermoplastic plastics material is injected in the second injection molding position to form the weld seam. In other words, a cavity for the injection molding process is essentially provided between the flanges in the second injection molding position. This cavity does not necessarily have to be arranged only in the flanges, but can also project at least partially into that plastics region of the respective half shells in which the actual walls of the half shells abut against one another. It is also possible to arrange the cavity only in this abutting region of the actual walls of the half shells and to omit the flange or to provide the flange only for further mechanical stabilization. It is likewise possible to provide a labyrinth seal in the flange (c.f. also further below) but the actual weld connection in the abutting region of the walls of the half shells.

The at least one channel, preferably both channels, preferentially have a substantially semi-circular or semi-elliptical, or also polygonal, preferably rectangular, triangular or trapezoidal cross-section.

According to a further preferred embodiment, at least one recess and/or hole, preferably a plurality of recesses and/or holes, which are preferentially distributed over the circumference, be provided in at least one of the flanges, preferably in both flanges, so as to form a weld seam having at least one peg. Therefore, in addition to the material fit between the weld seam and corresponding half shells, a form fit can also be provided, which further increases the mechanical strength of the weld connection. The holes and the pegs, formed thereby, of the weld seam furthermore have the very substantial advantage that, in particular when the material for producing the weld seam is selected to differ in terms of its color from the material of the lower shell and/or upper shell, it is very easy to visually check the quality of the weld seam. The pegs also furthermore have the effect of substantially simplifying the quality management, for example if a black material or colored material is used as the material for the half shells and a non-colored material or a material which is simply a different color from the material of the half shells is used for the weld seam.

In this case, if the weld seam is essentially imagined as an equator plane, these holes or the pegs formed thereby can be arranged perpendicularly to this plane, i.e. the holes can be formed as holes in the respective flange. The holes in the respective flange of the opposing half shells can be provided either directly congruently or offset. Alternatively, it is possible that the holes are provided in the equator plane such that they are essentially directed outwards. They can, for example, also be formed as channels between the two flanges, which are formed radially outwards (c.f. FIG. 10b, for example). The injection opening for the material of the weld seam is preferentially located in the radially outer contact region of the upper shell and lower shell, i.e. the contact surfaces between the two half shells each contain a mutually opposing channel provided by depressions in the contact region. There is preferentially at least one such injection point along the circumferential extent of the weld seam and this is furthermore preferably not arranged perpendicularly to the direction of extent of the weld seam at this point, but at an angle other than 90° in order to ensure a better injection behavior.

At least one of the molds can preferentially be formed such that baffles projecting into the interior of the container are formed, wherein these baffles preferably have holes which are particularly preferably realized via at least one angled slide in at least one of the molds. In this case, the baffles can have different shapes, for example they can be formed to be wavy or sectionally L-shaped or hook-shaped.

For forming baffles with holes or also depressions, a protruding contour can be formed on the at least one angled slide and, for releasing the formed component, the angled slide can be displaced laterally to release the depression generated by the contour, or the hole generated by the contour, in the injection molded component.

In this proposed process, a further structural element, preferably in the form of a dosing unit, can be connected to the container after the production of the container, or preferably during the production of the container, wherein this connection can preferably take place directly or via an adapter plate.

Possibly after previously fastening an adapter plate to the dosing unit, for example, the dosing unit can therefore be placed in the mold before the first injection molding position is assumed and, when forming the corresponding half shell, the dosing unit can be overmolded with the material of the half shell to form a tight connection between the dosing unit and the half shell or possibly the adapter plate and the half shell.

According to a preferred embodiment, the thermoplastic material of at least one of the shells and/or the weld seam, preferably the thermoplastic material of the two shells and the weld seam, is a polyolefin material, preferably a polyolefin material of preferably any with a high density of preferably at least 0.94 g/cm3, preferably HD-PE or PP. In this case, the material can also be glass-fiber reinforced. For the weld seam, owing to the relatively long flow length, it can be advantageous to use a reinforcement with flat glass fibers.

When opening the injection mold after the production of the two shells, the at least one upper shell remains in the first mold and the at least one lower shell remains in the second mold. Ejectors and/or undercuts can be used to ensure that the respective shell remains in the corresponding mold.

According to a further aspect, the present invention comprises a tool for carrying out a method as described above. The tool is, in particular, characterized in that it has an injection mold having a first mold and a second mold, which, in a first injection molding position, with the necessary closing force, together provides at least one cavity for an upper shell as well as at least one cavity for a lower shell, and enables the parallel production of at least one upper shell and at least one lower shell in an injection molding method. Furthermore, in this tool, the injection mold can be subsequently opened, wherein the at least one upper shell remains in the first mold and the at least one lower shell remains in the second mold. Moreover, in this tool, at least one of the two molds is rotatably and/or displaceably mounted so that the concave inner sides of the shells can be directed towards one another and the mold can be subsequently closed to realize a second injection molding position, so that the substantially congruent edge regions of the shells, typically in the form of congruent outwardly directed flanges, come into at least partial planar contact. In this tool, with the application of the necessary closing force, injection molding material can be subsequently injected into a cavity between or adjoining the edge regions to form a circumferential weld seam between the upper part and lower part.

Furthermore, in this tool, the injection mold can then be opened again and the at least one container can be removed and the rotated mold can then either be rotated back or displaced back, or rotated further or displaced further, into the original first injection molding position.

According to a further aspect, the present invention relates to a substantially closed container for carrying and/or storing gases and/or liquids which is made from a thermoplastic plastics material, preferably a polyolefin, in particular with a high density, having a lower shell and an upper shell which are circumferentially connected to one another via a weld seam to form the container. Such a container can be produced in a method as presented above and/or in device as presented above.

Such a container is preferably characterized in that the upper shell and lower shell each have a circumferential, preferably outwardly directed flange, wherein a circumferential channel, in which the weld seam is formed, is provided in the contact surface of at least one of the flanges, preferably in both flanges, wherein at least one hole, preferably a plurality of holes which are distributed over the circumference and into which pegs of the weld seam project, are further preferably provided in the flanges.

Finally, as a further aspect, the present invention relates to the use of a such container as a liquid container, in particular as a liquid container in the automotive field, preferably for conducting and/or storing brake fluid, wiper fluid, fuel, fuel additive, urea or as a gas container or flow element for gases in this field.

Further embodiments are described in the dependent claims.

BRIEF DESCRIPTION OF THE DRAWINGS

Preferred embodiments of the invention are described below with reference to the drawings, which merely serve for explanation and should not be seen as restrictive. The drawings show.

DESCRIPTION OF PREFERRED INVENTIVE EMBODIMENTS

Figure 1:
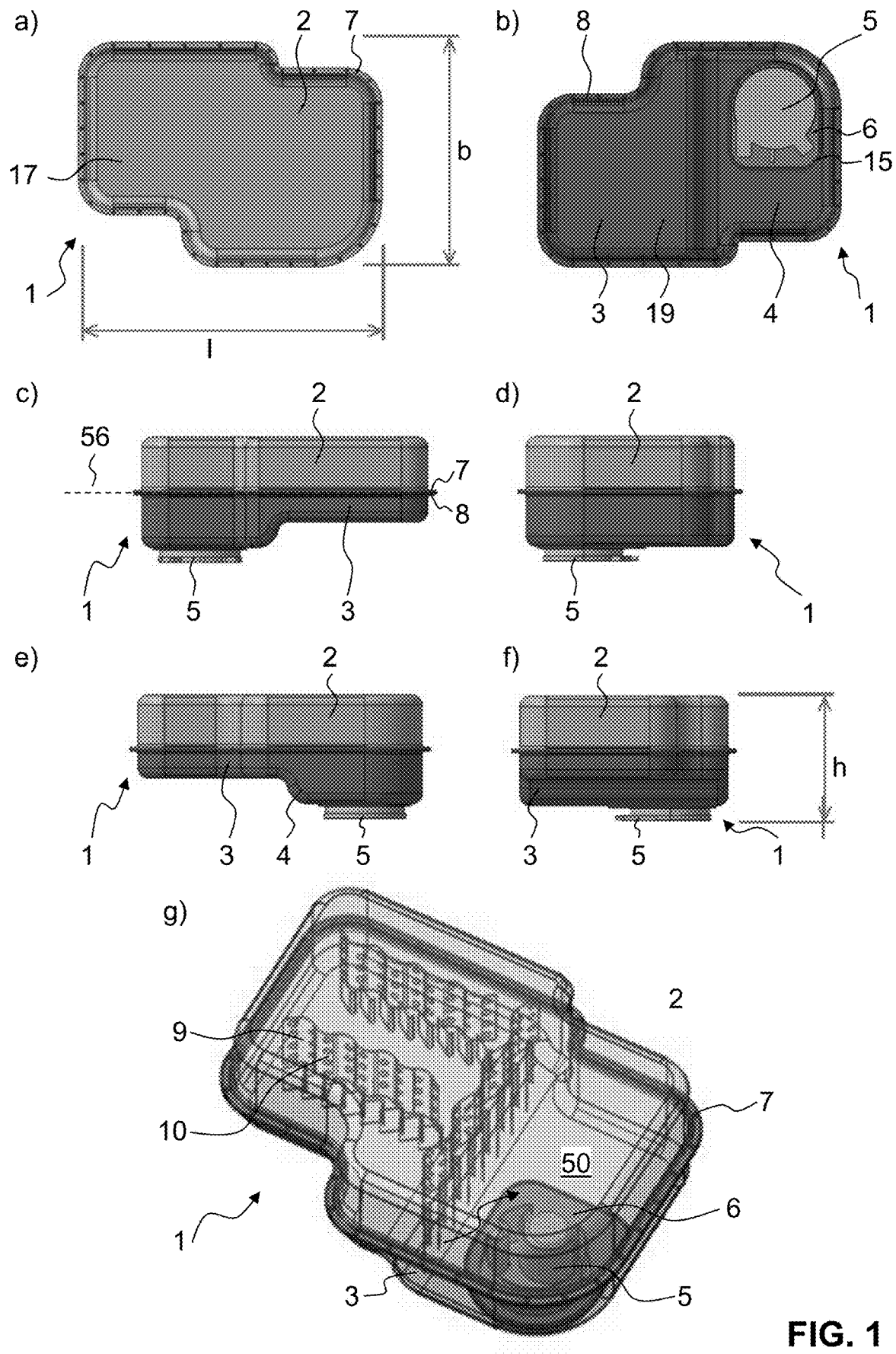
FIG. 1 a container produced according to the invention in different views, notably in a) in a view from above, in b) in a view from below, in c)-f) in the 4 side views and in g) in an angled perspective view from above.

A container produced according to the inventive method is illustrated in various views in FIG. 1; in a) from above, in b) from below, in c)-f) from the side, and in g) in a perspective view, wherein, in g) the walls of the upper shell and lower shell are illustrated transparently.

The container 1 is formed by an upper shell 2 and a lower shell 3, which adjoin one another along a planar parting plane 56, which extends essentially horizontally. In this parting plane, the upper shell 2 has a circumferential flange 7 and the lower shell 3 has a corresponding circumferential flange 8. The two half shells enclose a substantially closed cavity 50.

The top surface 17 of the upper shell 2 is formed substantially as a plane, whilst the bottom surface 19 of the lower shell 3 has a stepped form. Specifically, in the lower shell 3, there is a depressed region 4 which is deeper and in which a hole 15 is provided. A dosing unit 5 is arranged in this hole 15, wherein this dosing unit 5 is tightly fastened to the lower shell 3 via an adapter plate 6, which will be returned to further below.

Such a container has an approximate length of 550 mm and a width of circa 450 mm. Its height is in the region of circa 250 mm and such a container can be used, for example, in the automotive field for storing liquids, in particular for storing urea in diesel motor vehicles. The individual half shells are produced in an injection molding method from a thermoplastic plastics material, notably HD-PE here, in a multi-stage injection molding method, as will be explained further below.

So-called baffles 9 are arranged in the interior 50 of the container; more precisely, both projecting into the interior 50 from the top surface 17 of the upper shell and into the interior 50 from the bottom surface 19 of the lower shell 3. These baffles a prevent the liquid which is located in the interior 50 of the container from being shaken up too much during movement of the container and, in particular, irritating noises from occurring.

Figure 2:
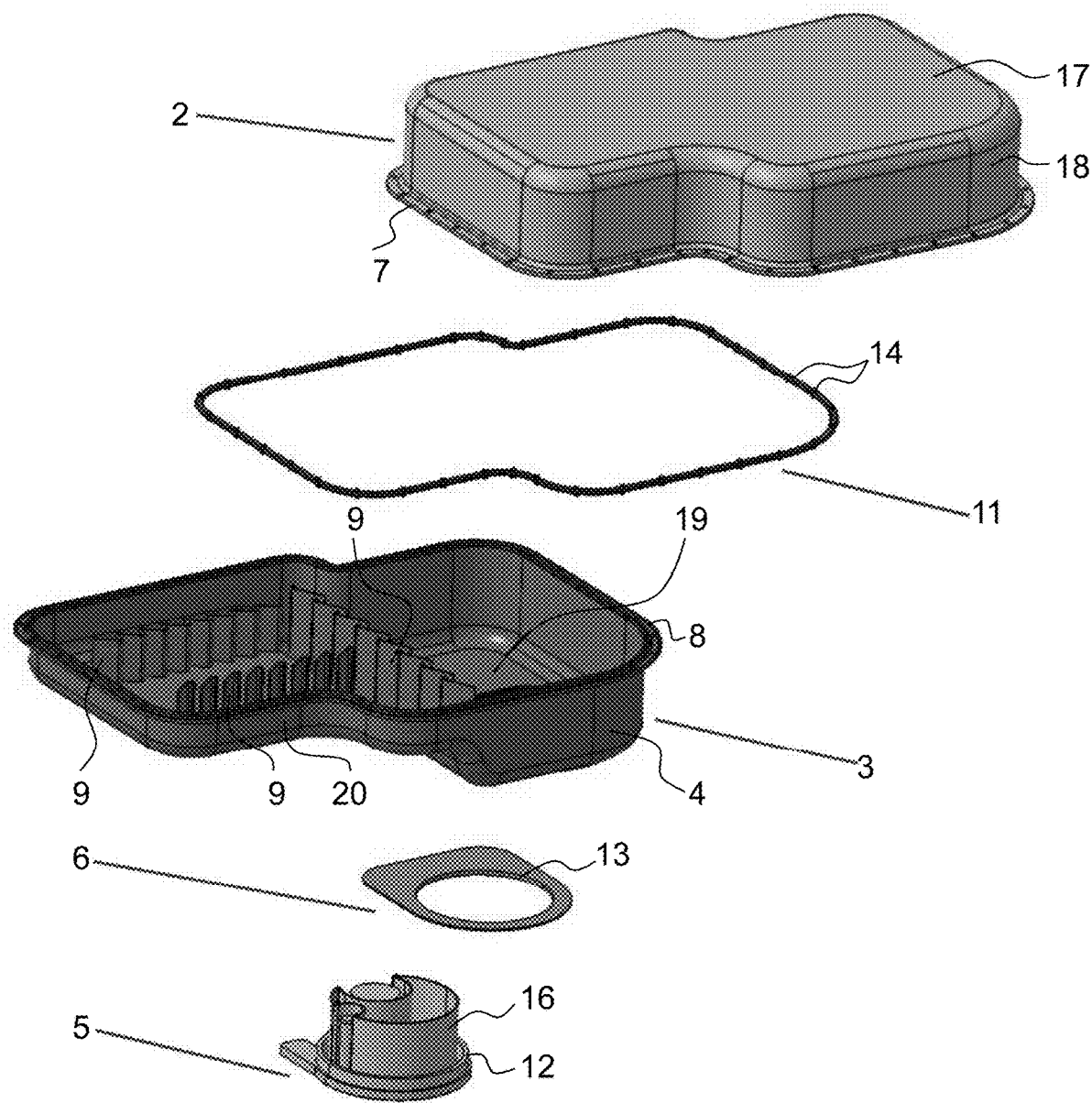
FIG. 2 the container according to FIG. 1 in an exploded illustration.

FIG. 2 shows the container produced according to the invention in an exploded illustration. It can be seen here that the dosing unit 5 has regions 16 projecting into the container; this dosing unit can even be designed with specific functional units such as valves or even control elements and electronics. The dosing unit 15 has a circumferential axial rib 12, which essentially forms a hollow cylinder, which rib 12, as will be explained further below, is then fastened to the adapter plate 6, specifically in a hole 13 of the adapter plate 6 or adjoining this. In this case, the regions 16 project through the recess 13 of the adapter plate 6 into the interior 50 of the container 1.

As can likewise be seen, the upper shell 2 has a top surface 17, from which a wall 18 is formed circumferentially downwards and on the lower edge of which the said flange 7 is circumferentially formed. The flange 7 has holes distributed uniformly over its circumferential length, which will likewise be returned to later.

Similarly, the lower shell 3 has a closed circumferential wall 20, on the upper edge of which the said flange 8 is formed. In this flange 8, there are also holes distributed over its circumferential length.

In a circumferential groove 24/25 of flange 7 or flange 8, a container weld seam 11 made from the same material as the two shells 2, 3 is formed in the respective contact region with the corresponding counter shell. Since both flange 7 and flange 8 have holes, this container weld seam has a corresponding number of pegs 14 which are directed perpendicularly to the main plane of the weld seam and result in a form fit also being provided to a certain extent between the two half shells 2 and 3 in addition to the material fit generated by the weld seam 11. Moreover, this design of the flanges 7, 8 results in the material which is injected as the container weld seam 11 being distributed as homogeneously as possible in the corresponding circumferential cavity, formed by the grooves 24/25, in the injection molding process.

Figure 3:
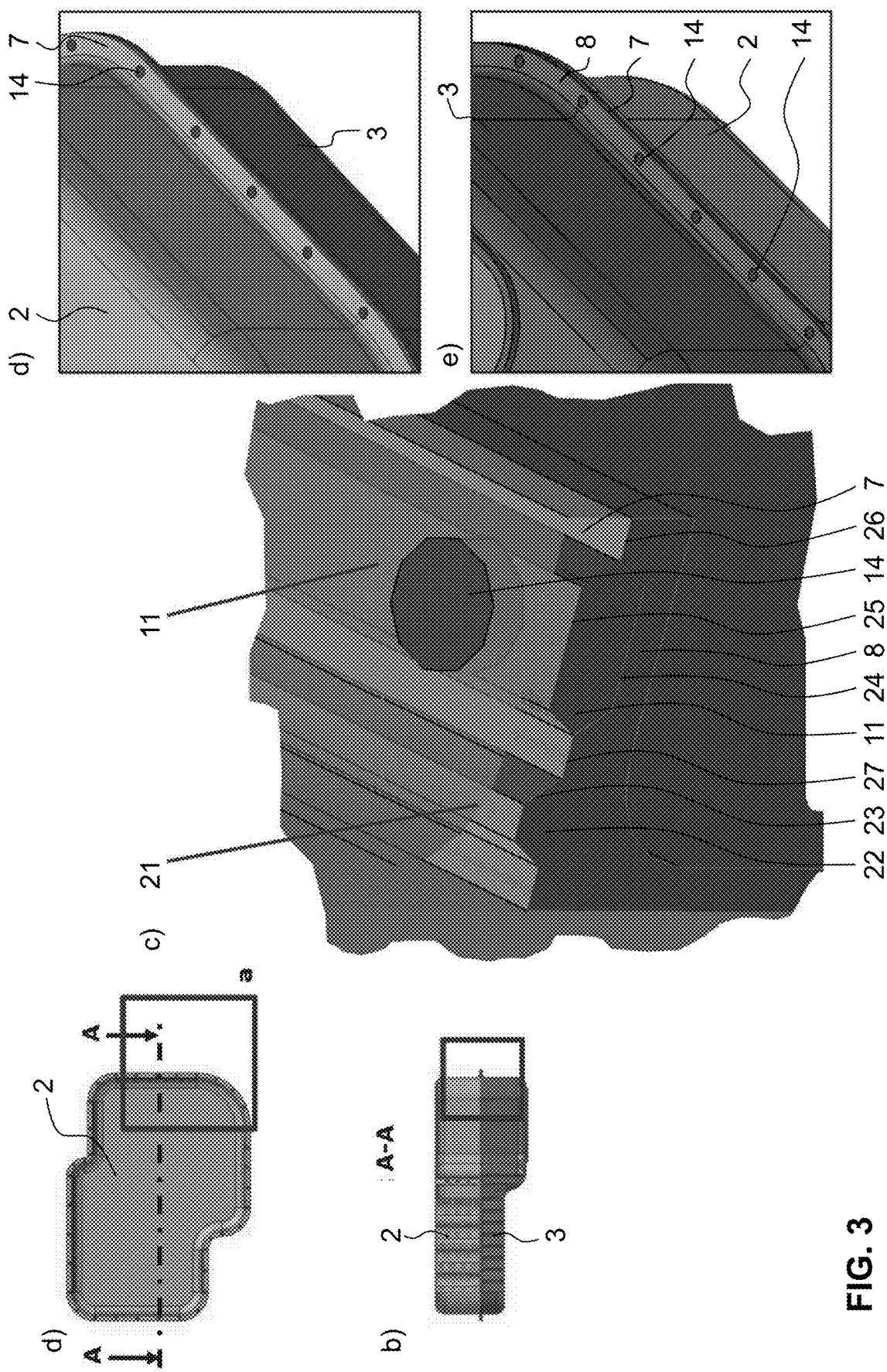
FIG. 3 an illustration relating to the weld seam of the container, showing in a) a plan view of the container and in b) a side view of the container with the sectional region illustrated with a transparent upper part in c), and in d) the detail a of figure a) from above and in e) the detail a of figure a) from below.

The design of the weld seam 11 in the region of the mutually adjoining flanges 7, 8 is illustrated specifically in FIG. 3. It can be seen here that the flange 7 of the upper part 2 has a circumferential channel 25 on its lower planar surface region facing the lower shell 3 or the flange 8 of the lower shell 3.

Similarly, the flange 8 of the lower part 3 in turn has a circumferential channel 24 on its surface facing the upper part 2. These channels are delimited externally by an outer contact region 26, in which the two flanges 7, 8 adjoin one another directly, and via an inner contact region 27, in which the two flanges 7, 8 likewise lie directly against one another. Therefore, when the two separately injection molded shells 2, 3 are placed correctly against one another so that the surfaces of the flanges come to lie against one another, a circumferential cavity into which the material for the container weld seam 11 can be injected directly, as will be explained further below, is formed between the two flanges 7, 8 via two corresponding channels 24, 25. So that this injection procedure into this cavity formed by the channels 24/25 proceeds as optimally as possible, i.e. both the mechanical strength and the leak-tightness can be ensured by the seal 11, a labyrinth seal is essentially formed in this case on that side of the respective flange 7, 8 which faces the inside of the container. Specifically, the flange 8 of the lower shell 3 has a circumferential ridge 22 and the flange 7 of the upper shell 2 has a corresponding circumferential groove 23. The groove 23 of the flange of the upper shell and the ridge 22 of the flange of the lower shell engage in one another with planar contact and therefore form a leak-tight delimitation of the cavity provided for forming the weld seam 22 (in the manner of a tongue-and-groove connection), which delimitation also withstands the injection molding process of the weld seam.

As already mentioned above, the two flanges 7, 8 have holes which are formed perpendicularly to the plane of the flanges and distributed over the circumferential length of the flanges 7, 8. During the injection of the weld seam 11, injection molding material is likewise incorporated into these holes, whereupon a plurality of pegs 14 is formed. On the one hand, this design of the flanges with the holes has the advantage that the injection molding material, which is usually introduced into injection points distributed along the circumference of the flange at 3-4 injection molding points, can be distributed as effectively as possible around the entire circumference and an optimal mechanical strength and leak-tightness are ensured. However, a further consequence of this is that, in addition to a purely material fit, a substantial contribution can be provided by a form fit between the respective shell and the material of the weld seam 11.

Figure 4:
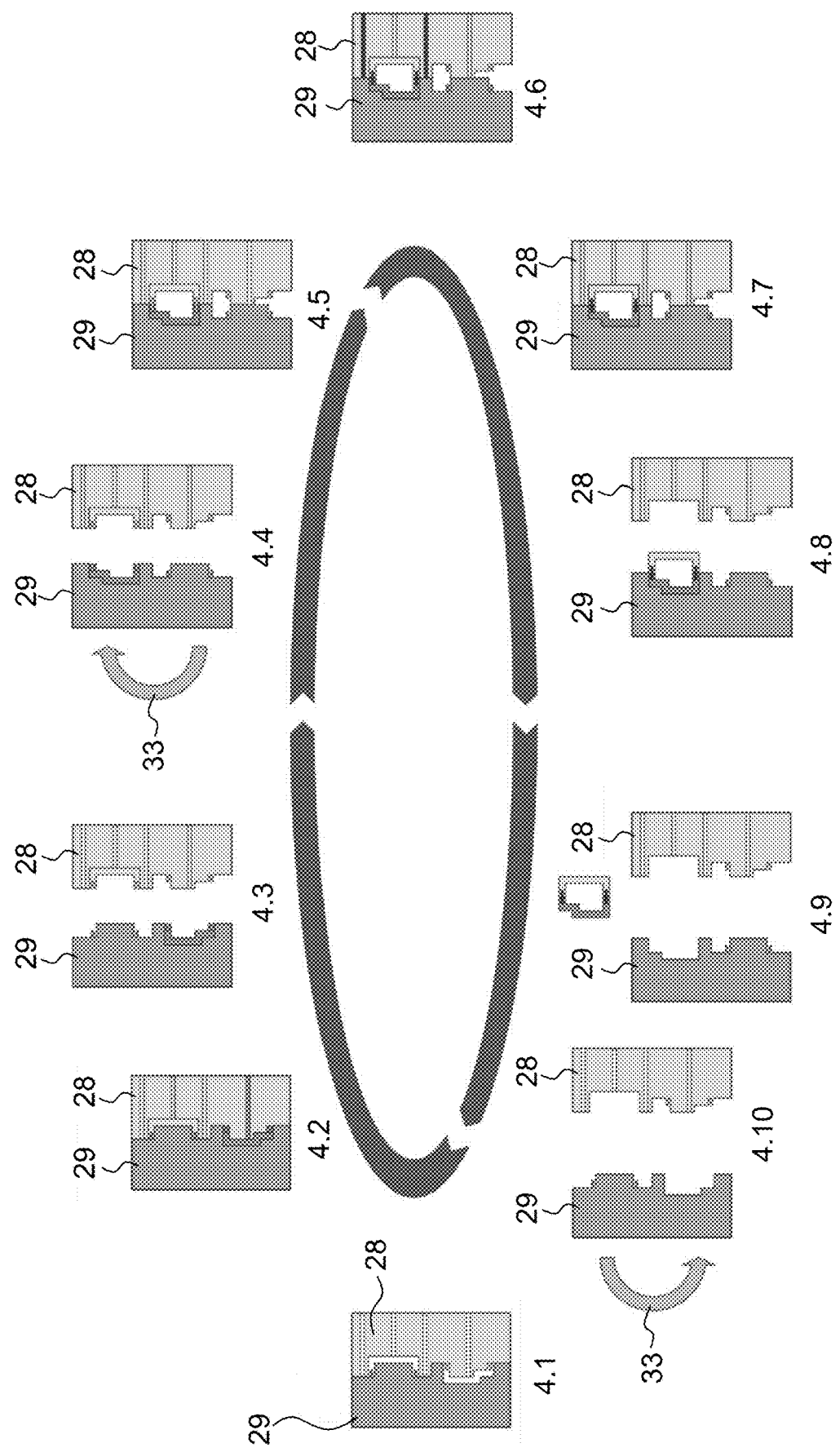
FIG. 4 the different production steps with regard to tool position in an overview.

FIG. 4 shows an overview of the production process according to the invention. The individual steps 4.1.-4.10 are illustrated in more precise detail in FIG. 5 and will be discussed again therein.

The process begins with the closed mold illustrated as 4.1. The mold is formed by the core-side mold 29 and the nozzle-side mold 28. The nozzle-side mold 28 is stationary—the injection molding materials are fed in here—whereas the core-side mold 29 can be rotated through 180 degrees. The closed mold 4.1 provides the cavity for the upper shell 2 at the top and the cavity for the lower shell 3 at the bottom.

As illustrated in the following state 4.2, the injection molding material for the upper shell and lower shell is now introduced into this closed mold in a first step and the upper and the lower cavity are filled accordingly. In this $1^{st}$ step, therefore, the upper shell and lower shell are individually manufactured in an injection molding process in a single mold.

After cooling of the mold, the mold is opened, wherein, as a result of undercuts, formed accordingly in the cavities, and/or ejectors, it is ensured that the upper shell 2 remains in the nozzle-side mold and the lower shell 3 remains in the core-side mold 29. The open mold is illustrated in 4.3.

As illustrated in 4.4, the left half shell of the mold is now rotated, in that the core-side mold 29 is turned through 180 degrees so that the lower part 3 and upper part 2, which have been newly injection molded in step 4.2, are brought into the correct position provided for closing.

As illustrated in 4.5, the mold is subsequently closed again so that the flanges 7 and 8 already discussed above now come into correct complementary tight contact and the cavity is formed accordingly in the channels 24 and 25 for the weld seam to be formed and so that, as illustrated in 4.6, the material for the weld seam 11 can now be injected into this cavity and the upper shell 2 and lower shell 3 can therefore be connected to one another.

As illustrated in 4.7, the mold is subsequently allowed to cool and then, as illustrated in 4.8, the mold is opened, wherein it is deliberately provided that the finished container is retained in the desired mold—in the core-side mold 29 here (undercuts and/or ejectors).

As illustrated in 4.9, the finished container is subsequently removed from the mold, typically via a robot, and possibly subjected to further processing steps.

As illustrated in 4.10, the core-side mold 29 is in turn subsequently rotated back through 180 degrees and the mold is closed again so that, at the end, the original state 4.1 is in turn reached and the process can be carried out again in a cyclical manner.

The individual steps of this method shall now be explained in detail with reference to the illustrations of FIG. 5.

FIG. 5a) shows the closed state 4.1 at the start of the process. The tool is closed, the closing force is realized for the injection molding position 01 (c.f. lower bar and 1 in the circle), the ejector plate of the station 1 is retracted and the ejector plate of station 02 is likewise retracted. The rotary plate 32, which is provided on the clamping plate on the production machine on the core side, is in the 0 degrees position. It can be seen here how the region of the core-side mold which forms the upper shell 2 has a lifting segment 41 with which the upper shell can be deliberately pushed away from the core-side mold 29.

It can likewise be seen how an angled slide 42 is arranged there. This angled slide 42 is provided to enable the formation of the holes 10 in the baffles 9. This is done such that, on the angled slide 42, on the surface remote from the lifting segment 41 and the surface facing the baffle segment to be formed, the corresponding contours for forming the holes are provided (in the form of pegs). Therefore, with reference to the holes in the baffles 9, the region 46 is essentially topologically prescribed by the angled slide 42. After the injection procedure, when the newly injection molded upper shell 2 is then to be released, the angled slide 42 can be displaced slightly, relative to the lifting segment 41, the peg-shaped shaping elements on the angled slide 42, which reach into the holes formed in the corresponding baffle 9, are thus drawn out of these holes and the formed molded part 2 is released and can then be removed. The pin ejectors 40 for the lower shell can likewise be seen here.

The cavity 34 for the upper shell 2 is formed in the upper region between the nozzle-side mold 28 and the core-side mold 29. It is formed by the delimiting contour 36 on the core-side mold and the delimiting contour 37 on the nozzle-side mold.

Analogously, the lower shell 3 is formed in the lower region of the tool by the cavity 35, which is formed by the delimiting contour 38 on the core-side mold and by the delimiting contour 39 on the nozzle-side mold.

In this case, the parting plane of the mold has a stepped form. In the upper region for producing the upper shell 2, the parting plane 47 is arranged further to the left in this first injection molding position and, in the lower region for producing the lower shell 3, the parting plane 48 is arranged further to the right. Accordingly, in the closing direction 57, the parting plane of the region for producing the lower shell 3 is arranged further forwards in the first injection molding position. When the two half shells 2, 3 are different, this stepped parting plane is then important to prevent the regions which are not used, which are the regions which form the concave inner surface of the respective shell, from colliding with one another in the second injection molding position, as illustrated, for example, in FIGS. 5 e) and f).

As illustrated in FIG. 5b) as state 4.2, the cavity 34 for forming the upper shell 2 is filled with injection molding material via the injection-molding material feed 43 in the state 4.2. Simultaneously and in parallel therewith, the cavity 35 is filled via the injection-molding material feed 45 at the bottom and the lower shell 3 is formed.

In this first position, which is denoted by a number 1 in the circle below the figure, the necessary closing force of, for example, 500-1000 t for this procedure is applied. The injection molding machine carrying the mold should be capable of applying this closing force in the first injection molding position.

As illustrated in FIG. 5c) as state 4.3, the tool is subsequently opened as far as position 2 in the circle at the bottom after sufficient time has elapsed for the new mold parts to cool, wherein the angled slide 42 has, however, firstly been displaced slightly upwards, (releasing the holes in the baffles) and subsequently pushed away slightly, with the lifting segment 41, to release the upper part 2 and to ensure that this remains adhered to the nozzle-side mold.

The core-side mold 29 is subsequently rotated through 180 degrees via the rotary plate 32, as is then illustrated in the end position in FIG. 5d) in position 4.4. The upper shell 2 and lower shell 3 are now directly opposed and the two flanges 7, 8 are already aligned relative to one another and are positioned ready for the subsequent planar contact.

Figure 5:
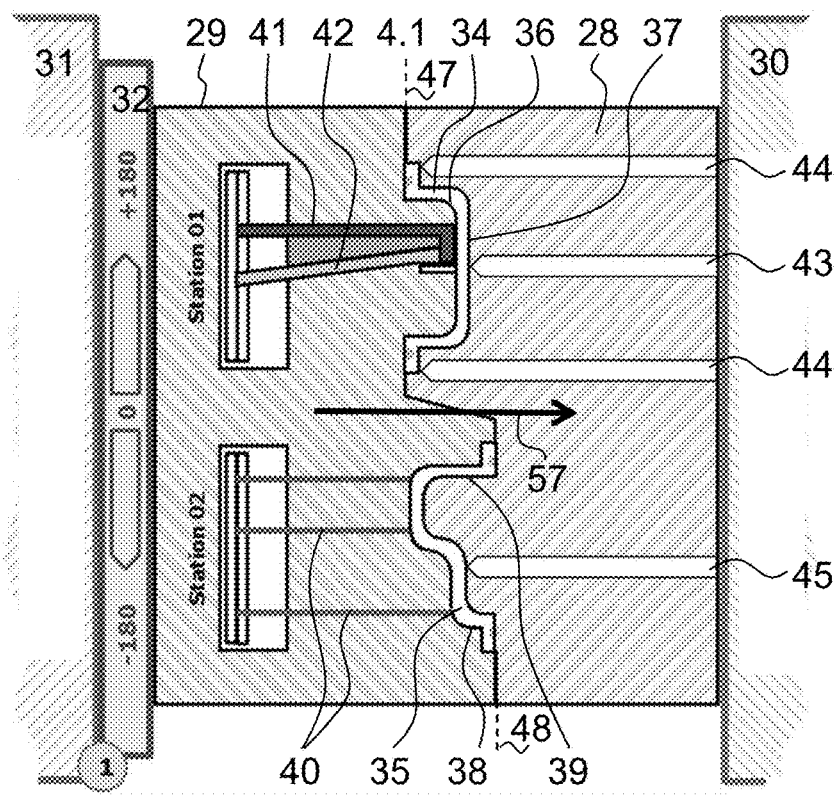
FIG. 5 in a)-k) the different production states 4.1-4.10.
Figure 5:
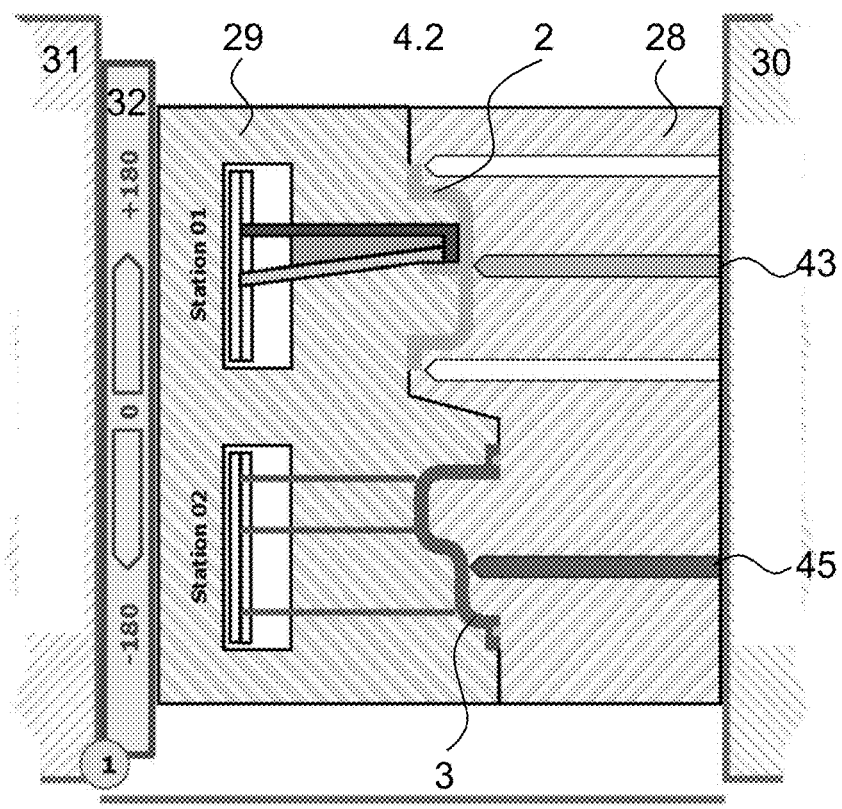
Figure 5:
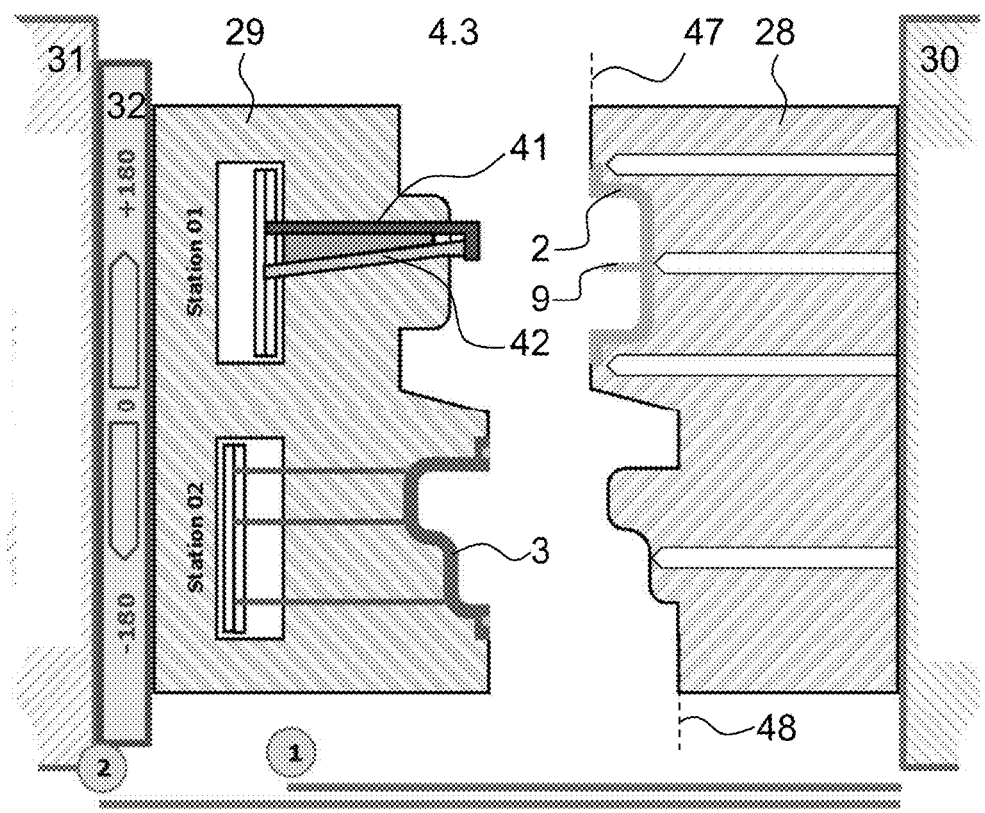
Figure 5:
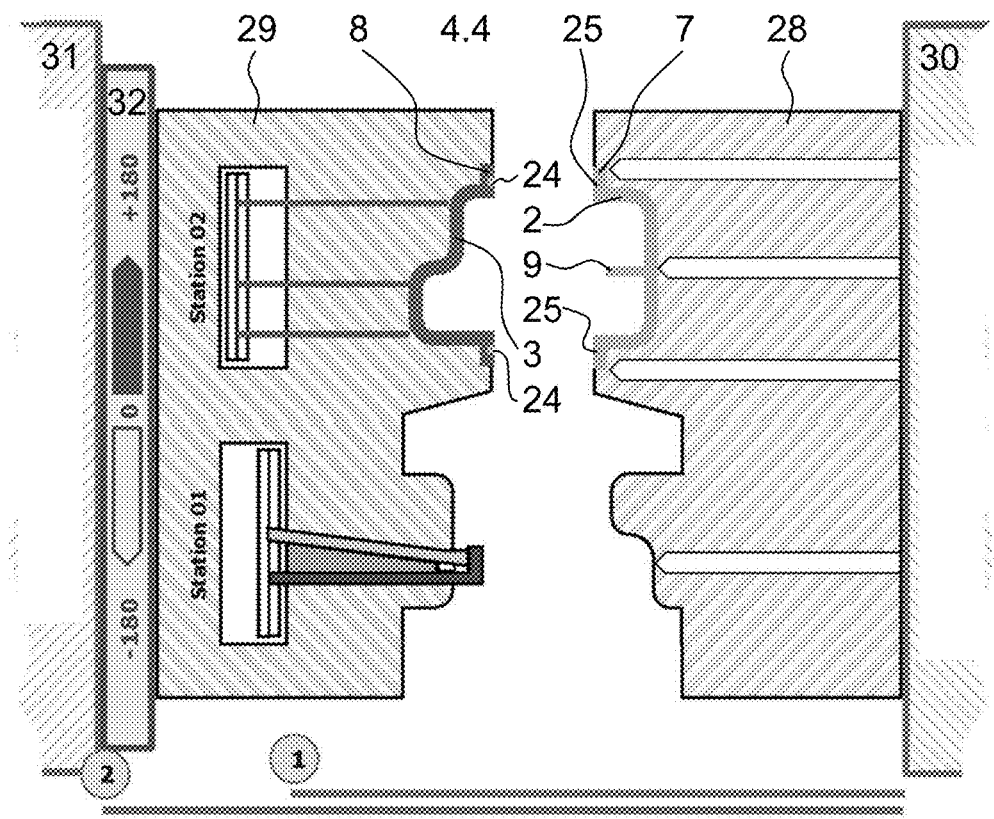
Figure 5:
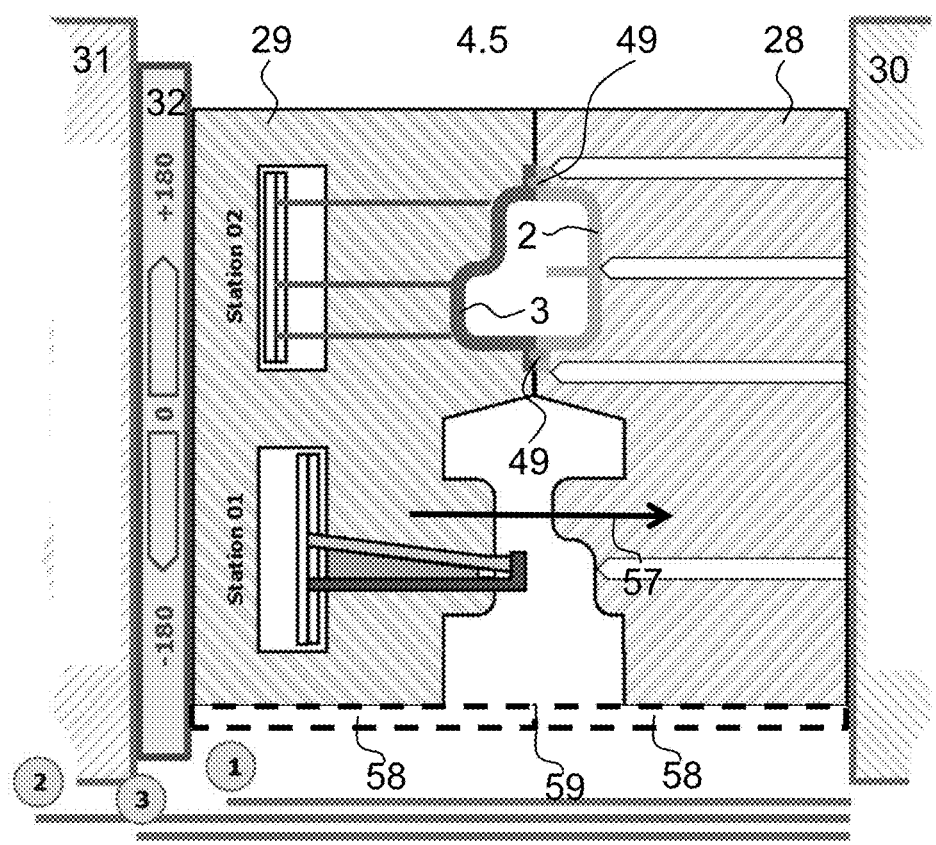
Figure 5:
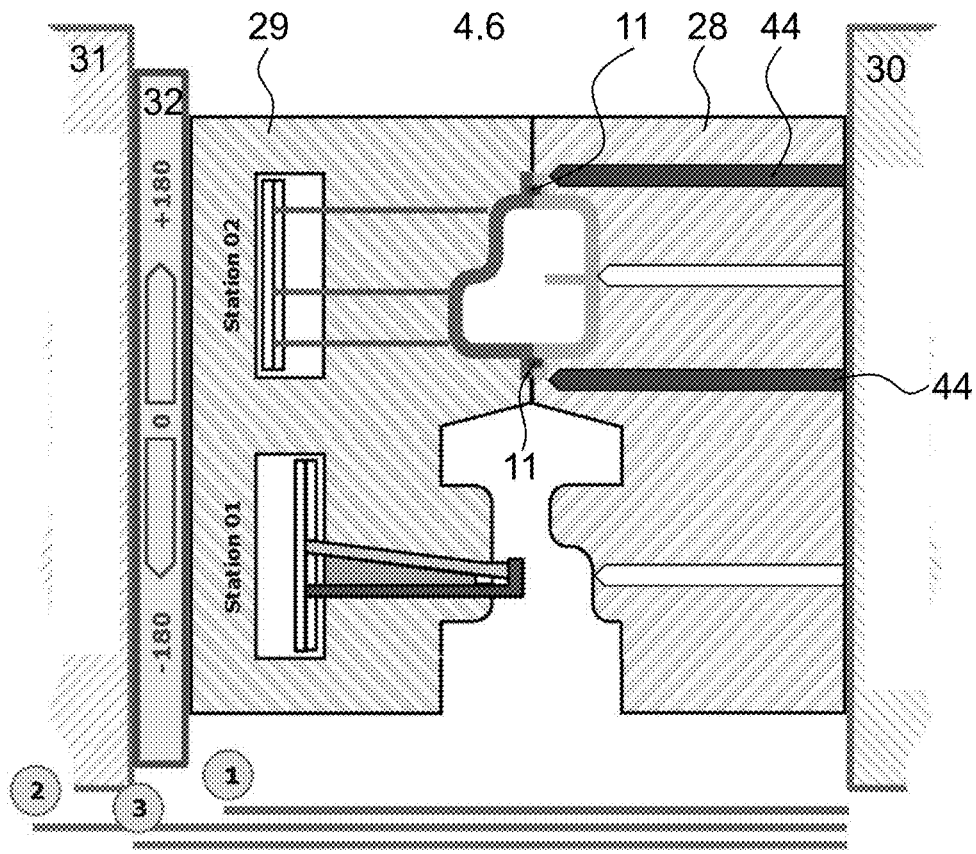
Figure 5:
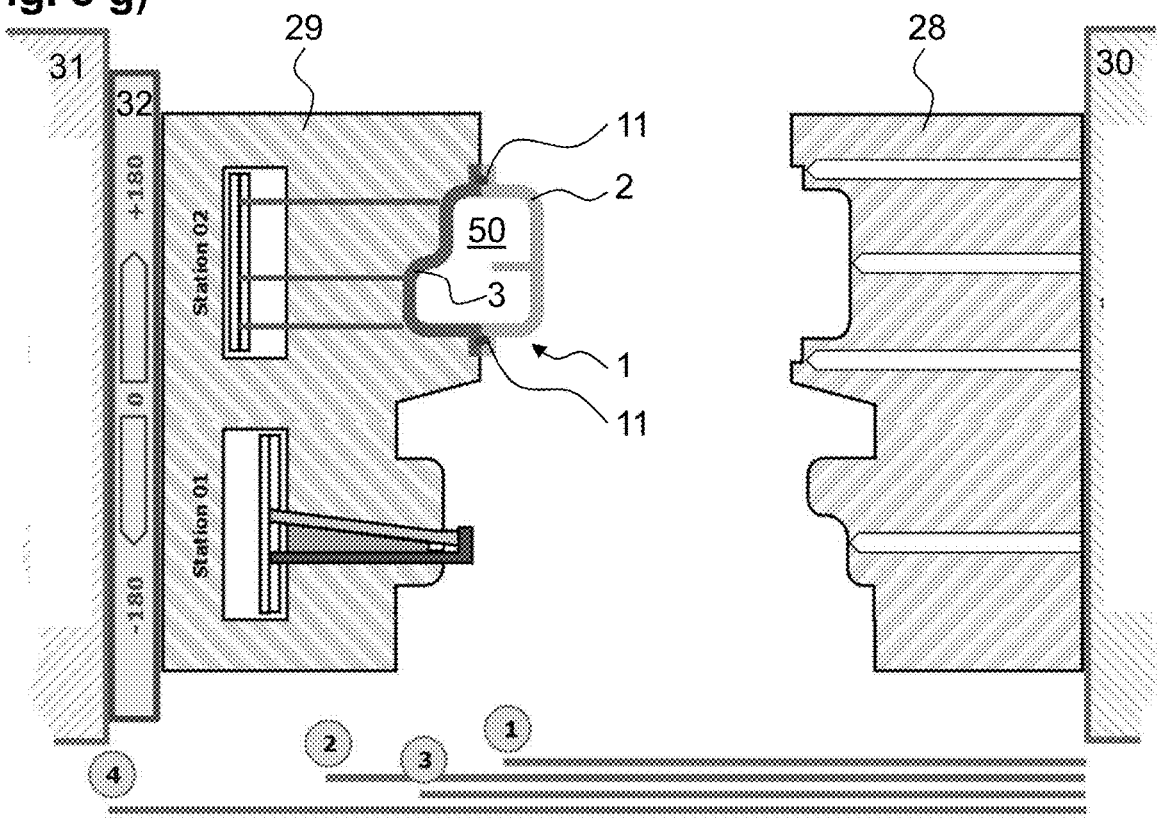
Figure 5:
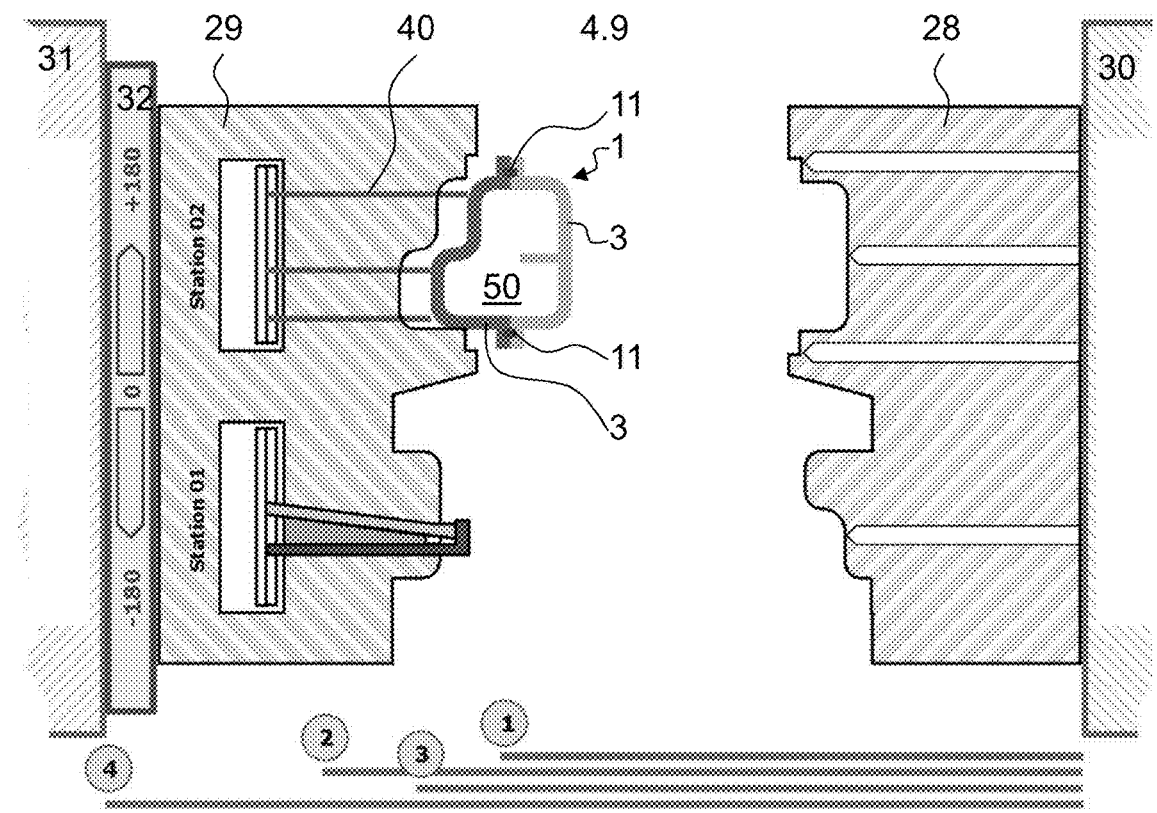
Figure 5:
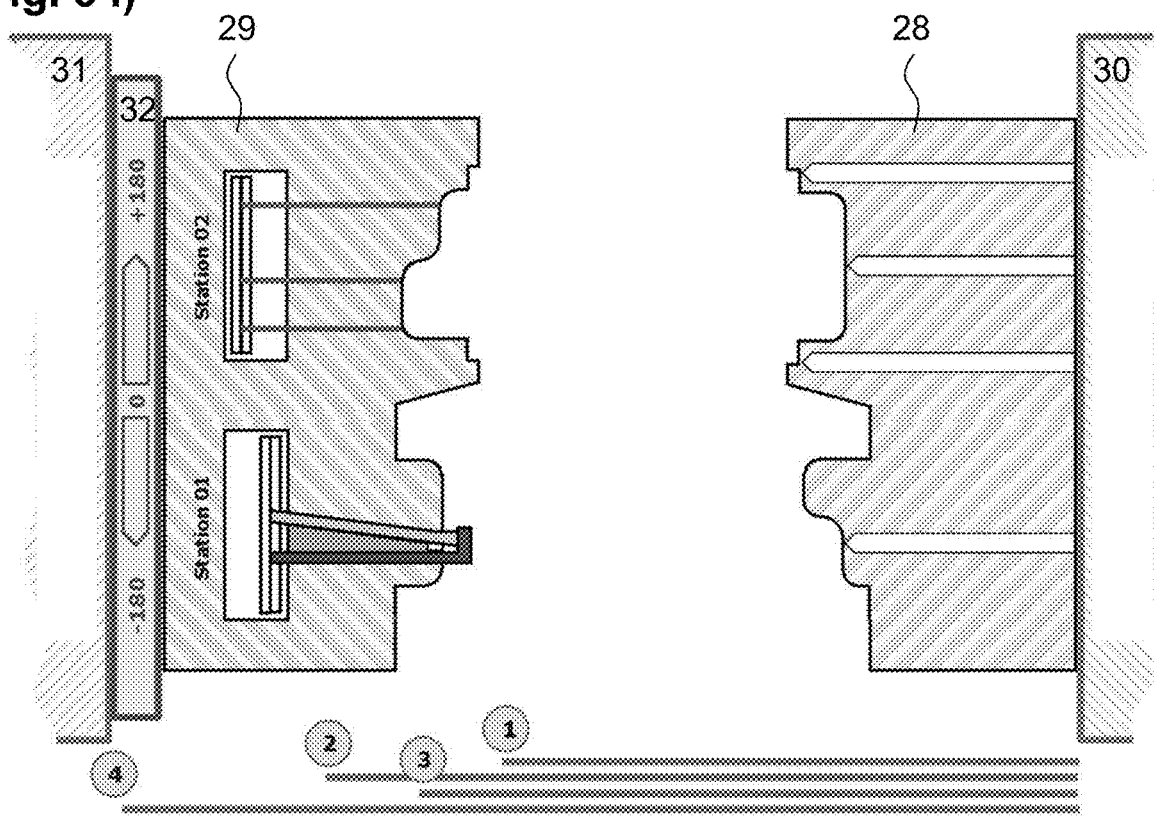
Figure 5:
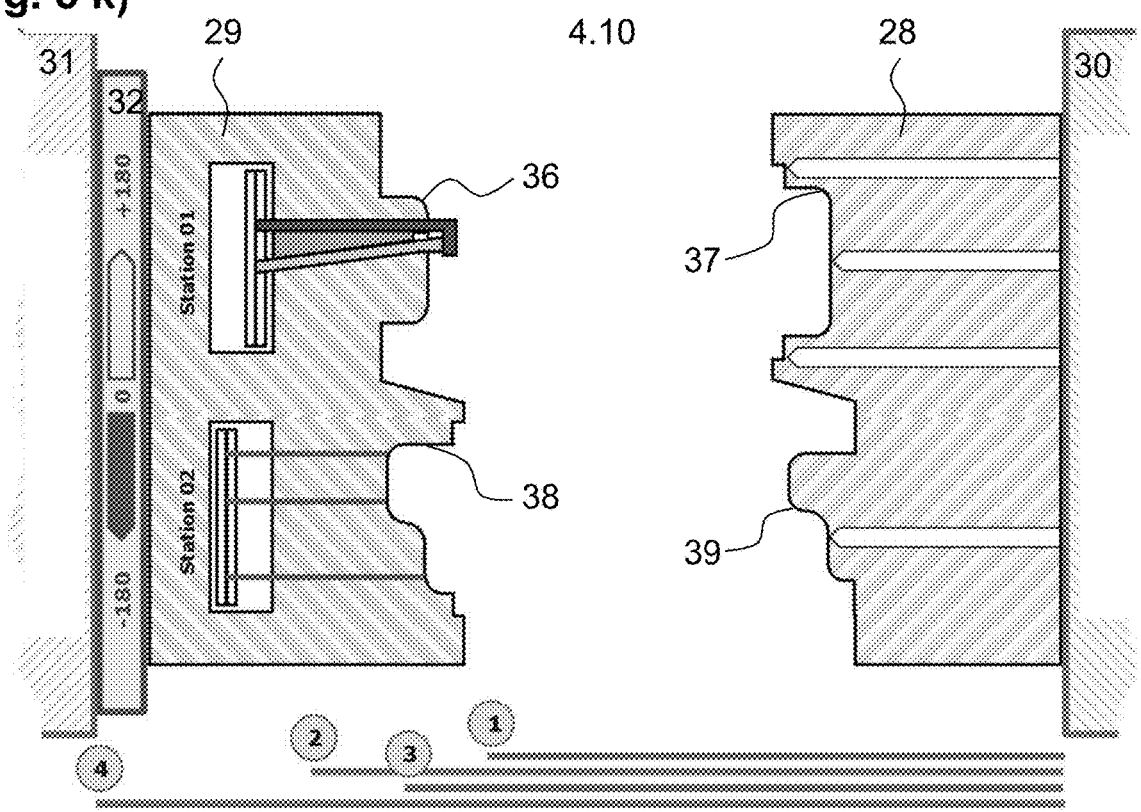

In the next step, the mold is closed, which leads to the end state as illustrated in FIG. 5e) as position 4.5. In this state, which is indicated at the bottom by a 3 in the circle, a closing force is again built up as for the 1$^{st}$ injection molding state, which is illustrated in FIG. 5 b). The tool must be constructed accordingly so that it can build up these two different closing forces in the different opening states. The different positions of 1 in the circle and 3 in the circle as illustrated at the bottom of FIG. 5f) are necessary for preventing the contours illustrated at the bottom of FIG. 5f, which are not being directly used, from colliding.

The two flanges 7, 8 now adjoin one another with direct and planar contact so that a circumferential cavity 49 is formed in the two circumferential channels 24, 25 discussed above. Material is now injected directly into this cavity 49 via 3-4 injection-molding material feed channels 44 so that a material-fitting connection, supported by a form-fitting connection, is formed between the two half shells, specifically via the weld seam 11. The material injected here is typically the same as the material for the half shells, i.e. HD-PE in the present case.

In this second position, which is denoted by a number 3 in the circle below the figure, the necessary closing force for this procedure, again of 500-1000 t, for example, is applied.

The injection molding machine carrying the mold should be capable of applying this closing force in the second injection molding position, which is arranged at a different height in the closing direction, notably further back in the closing direction 57 in this case.

As can be seen in FIG. 5e), the lower region is now essentially held with a spacing and without contact. Under the said closing forces, this can lead to problems. To be able to prevent this, supports are provided against the respective mold 28 and 29, as indicated schematically in this figure by extensions 58 denoted by dashed lines, which supports then come into contact in this second injection molding position and absorb the closing force at the contact surface 59 in the lower region.

In turn, after an appropriate cooling time, the mold is opened again, as illustrated in FIG. 5g) as state 4.8, wherein, by means of corresponding undercuts and/or ejectors, care is taken to ensure that the now finished and connected container component 1 remains on the core-side mold 29 during the opening of the mold (it can also deliberately remain on the other mold).

Subsequently, using the pin ejectors 40, as illustrated in FIG. 5h) as state 4.9, after a robot has taken hold of the container 1, the container is released from the core-side mold 29 using the ejectors 40 and transported for further processing steps or storage.

Subsequently, as illustrated in FIG. 5i), the core-side mold 29 is rotated back through 180 degrees again so as to then arrive in the original state of the open mold once the pin ejectors have been retracted again, i.e. in the state illustrated in FIG. 5k) and denoted by 4.10. The mold is subsequently closed again so as to arrive at situation 4.1, as illustrated in FIG. 5a).

Figure 6:
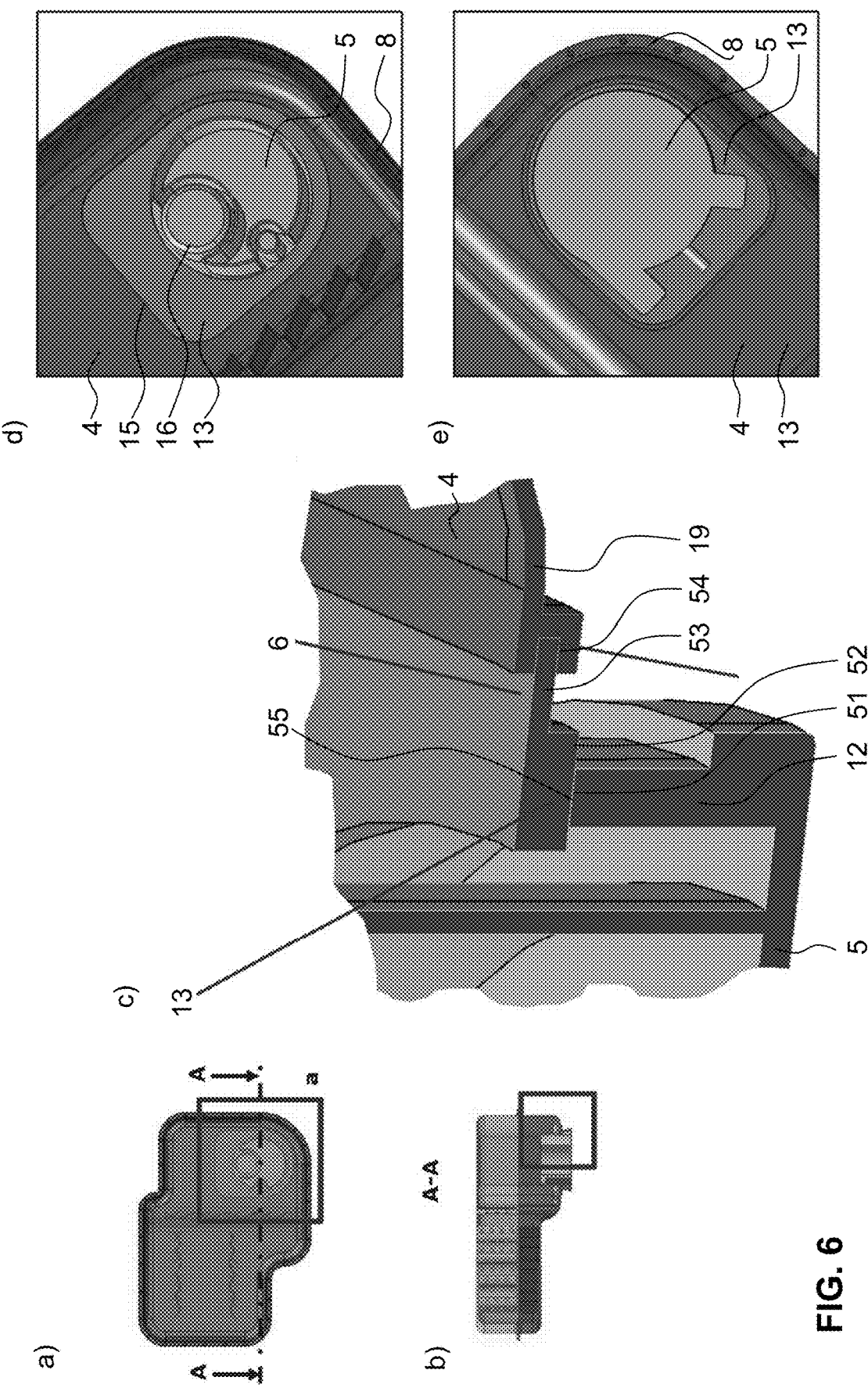
FIG. 6 an illustration of the details relating to the fastening of the dosing unit on the lower shell via the adapter plate, showing in a) and b) a view from below and a section along A-A of the container as a whole, in c) a perspective sectional illustration through the fastening region, in d) a view of the fastened dosing unit and the adapter plate from inside the container and in e) a view from below of the fastened dosing unit and the adapter plate from outside the container.

FIG. 6 shows how the dosing unit 5 can be fastened to such a container 1. The dosing unit 5 has a circumferential rib 12 which projects upwards. This circumferential rib 12 has a flattened upper edge 51. The dosing unit 5 is now preferentially not injection molded or welded directly onto the base; instead, the dosing unit 5 is firstly welded to an adapter plate 6, specifically in that the underside 52 of the adapter plate 6 is circumferentially connected to the said upper edge 51 of the circumferential rib 12 via a weld seam 55. Therefore, in a first preparatory step, the dosing unit 5 is accordingly fixedly connected to the adapter plate 6 with material fit. The production of this connection typically takes place in a hot plate welding method.

This dosing unit 5 connected to the adapter plate 6 is preferentially subsequently placed directly into a corresponding cavity in the contour 38, and, in an in-mold method, an edge taper 53 of the adapter plate 6 is subsequently overmolded directly with the material of the lower shell in the region 54 and a durably fixed and tight connection is thus ensured between the adapter plate 6 with the dosing unit 5 on the lower part 3 of the container 1.

Figure 7:
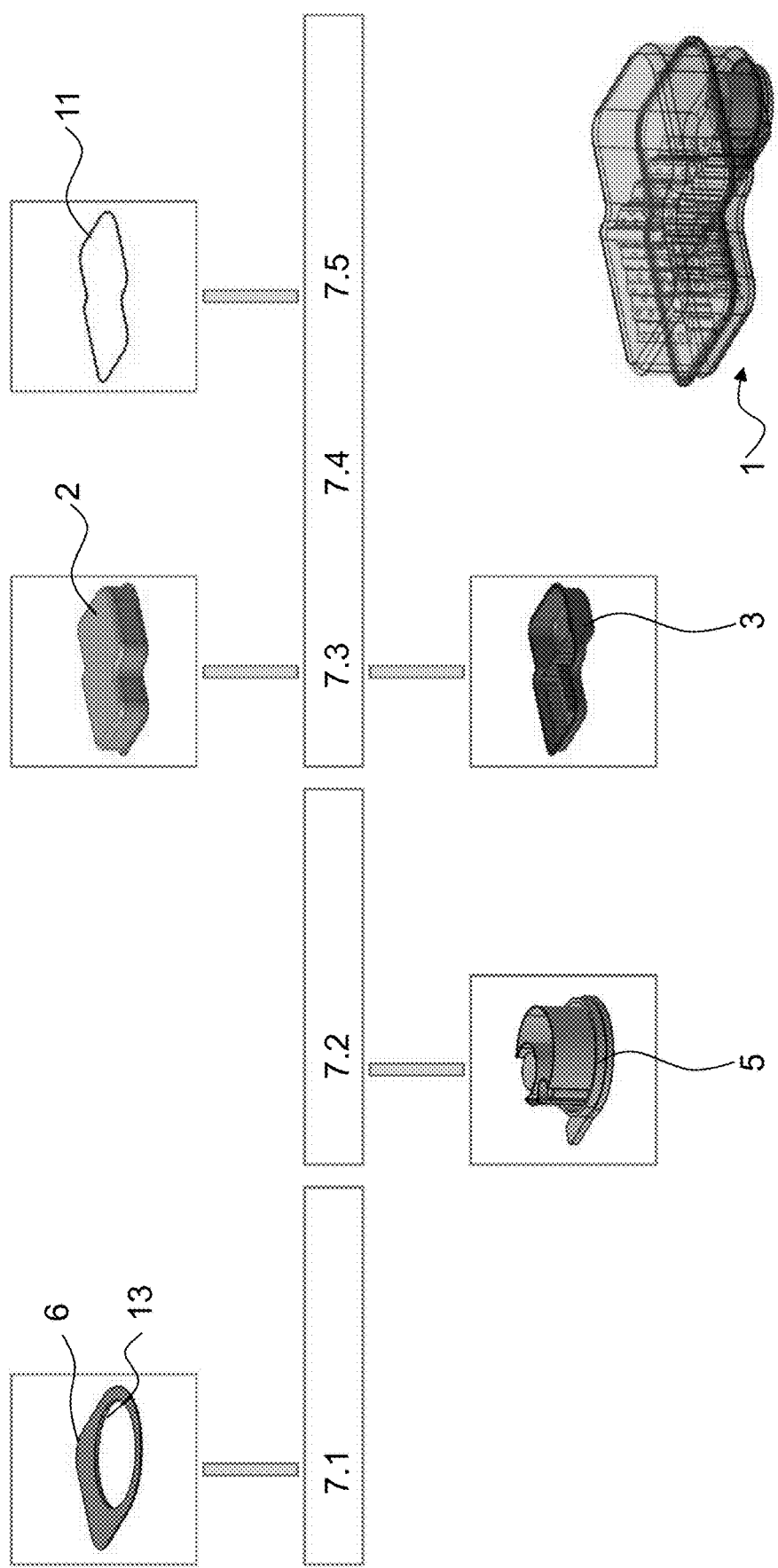
FIG. 7 the different production steps with regard to elements of the container in an overview.

The individual steps, now shown in terms of the parts rather than in terms of the tool, are summarized once again in FIG. 7. In a first step, the adapter plate is made from 1 ID-PE in a simple injection molding method, directly with the hole 13. This is step 7.1.

In the following step 7.2, the separately produced dosing unit 5 is connected to the adapter plate 6 in a hot plate welding method.

Then, in step 7.3, after the dosing unit 5 with the adapter plate 6 fastened thereto has been inserted into the mold (specifically into the cavity 35), the step sequence which is indicated in 7.3-7.5 and which generates the closed container (as illustrated bottom right in a perspective illustration) via the weld seam 11, will take place in the tool, as illustrated in FIGS. 4 and 5.

Figure 8:
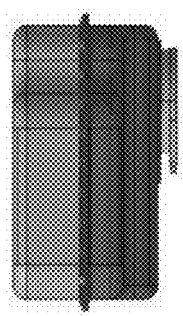
FIG. 8 in the upper row, the different side views of the container with the parting line in one plane; in the lower row, the different side views of the container with alternative parting lines between the upper shell and lower shell denoted by dashed lines.
Figure 8:
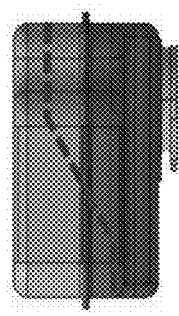
Figure 8:
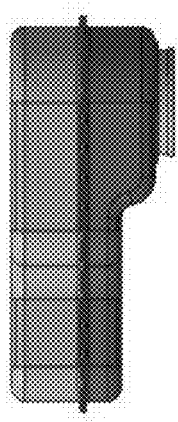
Figure 8:
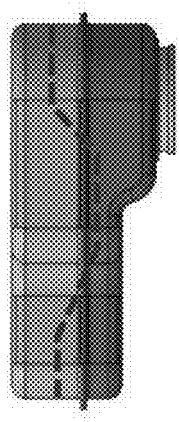
Figure 8:
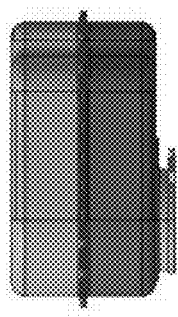
Figure 8:
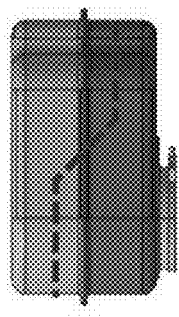
Figure 8:
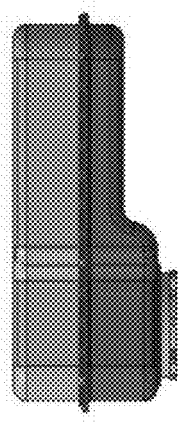
Figure 8:
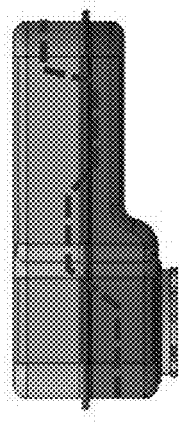

According to the conventional method, such containers are typically produced in that the upper shell 2 and the lower shell 3 are produced in an individual production process and the two shells are subsequently connected to one another along the equator line in a hot plate method. As a result, this method substantially only enables constructions which, as illustrated in the upper row in FIG. 8, have a planar connecting line, i.e. flanges of the upper part and lower part which extends in one plane.

A substantial advantage of the method proposed here is that this connecting line no longer necessarily has to be formed as a plane. As illustrated in the lower row of FIG. 8, it is possible to deviate from the connecting plane and to provide curved and freely designed contact lines between the upper shell 2 and lower shell 3. When using the proposed method, freely designing the contact lines in this way enables new functionalities without having to compromise on the leak-tightness and strength as a result of this design freedom.

Figure 9:
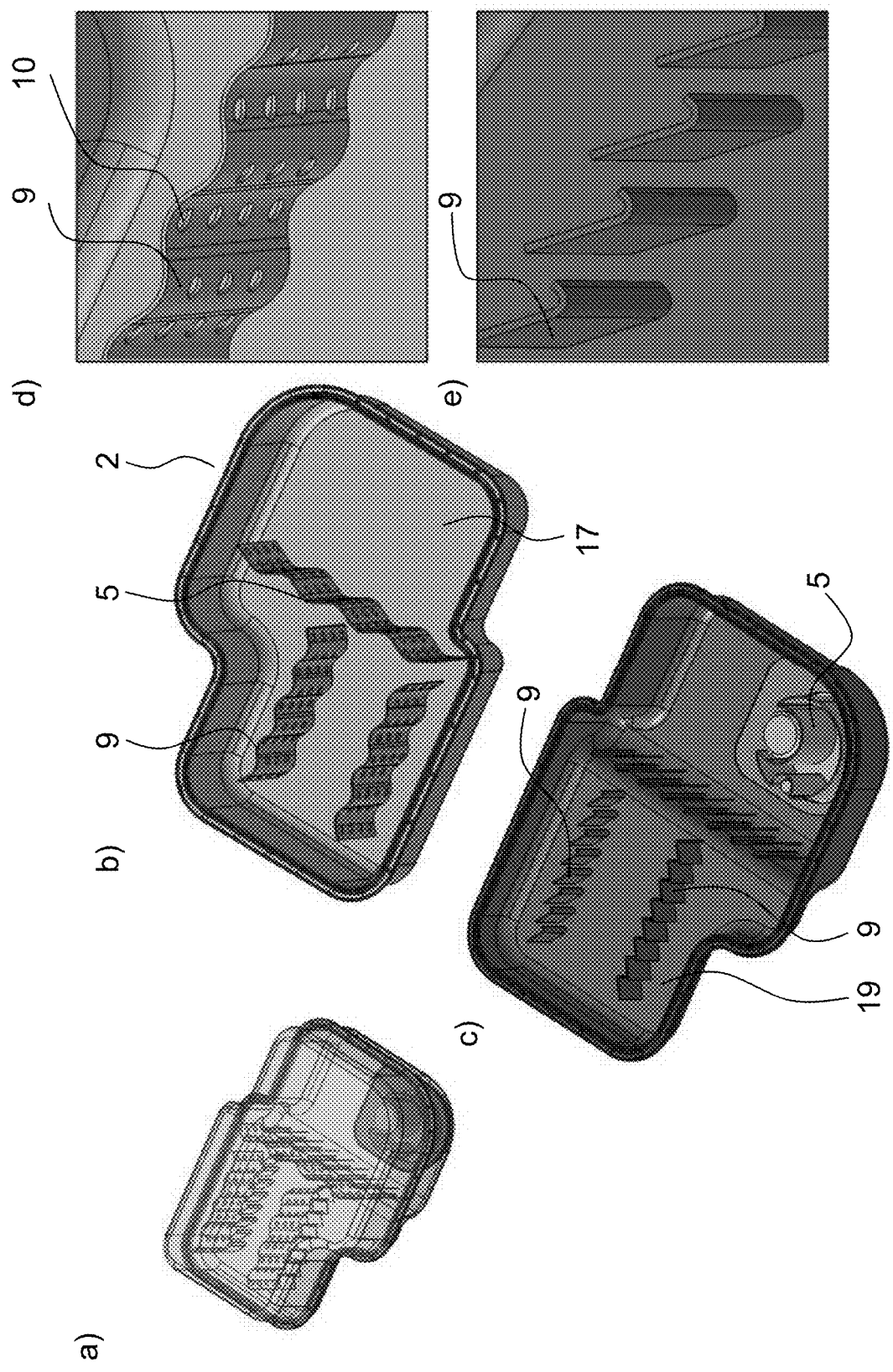
FIG. 9 different illustrations of baffles, showing in a) the container in a transparent perspective view, in b) the arrangement of baffles on the inner side of the top surface of the upper shell, in c) the arrangement of baffles on the inner side of the bottom surface of the lower shell, in d) baffles in a wavy design with holes and in e) baffles in a sectionally hook-shaped form.

In FIG. 9, the baffles 9 discussed above are illustrated once again in detail. It can be seen here how such baffles 9 are provided both in the upper shell 2 and in the lower shell 3. In the assembled container, these baffles then possibly mesh with one another in the interior 50 of the container 1. In the case of the baffles 9 in the upper shell 2, these are provided with the holes 10, which have already been discussed in detail above, and essentially have a wavy form, whereby the stabilizing effect on the liquid in the container is further increased and, furthermore, less material needs to be used (costs) and the result is a lower weight of the container as a whole.

Figure 10:
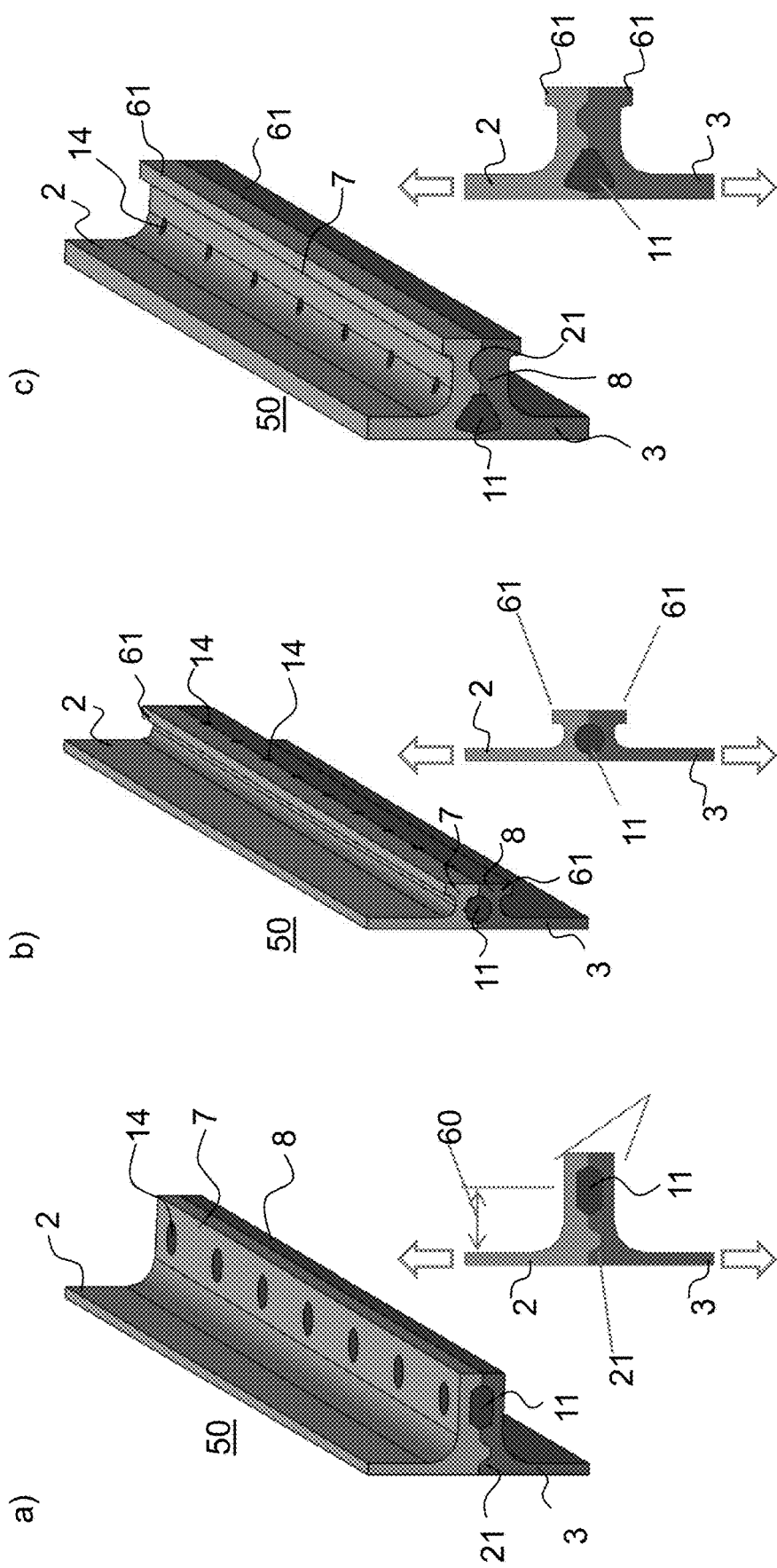
FIG. 10 different designs of the mutually adjoining edge region of the upper shell and lower shell, showing in a) an embodiment with a labyrinth seal and a container weld seam arranged in the flange, in b) an embodiment without a labyrinth seal and in c) an embodiment with a labyrinth seal in the flange region and a container weld seam in that region in which the wall portions meet one another.

Various design options for the mutually adjoining edge region of the upper shell 2 and lower shell 3 are illustrated in FIG. 10. FIG. 10a shows a possible way in which the outwardly directed flange can be designed. An outwardly directed flange 7 is integrally formed on the upper shell 2 and a corresponding flange 8 is integrally formed on the lower shell 3. The container weld seam 11 is formed in that region in which these flanges 7 and 8 adjoin one another in a planar manner. To this end, each flange contains a channel, each of which are trapezoidal here, which channels then form the cavity for the second injection molding step and thereby enable the formation of the container weld seam 11. The pegs 14, which are already discussed above, are likewise formed, which pegs are formed essentially perpendicularly to the respective flange plane. These pegs can either be formed only in one flange, in flange 7 here, or—and this is the preferred design—there can be pegs in both directions, which means corresponding holes not only in flange 7 but also in flange 8. The corresponding holes and therefore the pegs 14 formed thereby, can either be arranged in alignment or offset so that pegs 14 alternate upwards and downwards along the line of extent of the container weld seam.

In the actual joint region of the walls of the upper shell 2 and lower shell 3, these adjoin one another such that a mechanical labyrinth seal 21 is formed, substantially analogously to the situation which was illustrated in FIG. 3 and also already discussed above in this connection.

As illustrated on the bottom right of FIG. 10a, such a circumferential container weld seam can be tensile-loaded with high forces along the arrows illustrated therein; however, they can also be simultaneously subjected to a torque load 60. Typically, such containers, which can refer to actually closed containers or to flow settling devices, are tested in terms of the pressures which can be absorbed, that is to say that the forces applied are not necessarily the same as those indicated by arrows here, but are possibly other forces.

As illustrated in FIG. 10b, it is also possible that the container weld seam is not arranged exclusively in the actual flange region, but partially in the flange region and partially in that region in which the two walls of the upper shell 2 and lower shell 3 adjoin one another edge to edge. The outwardly directed flange formed by the two flange parts 7 and 8 is designed so that it does not protrude as far here and the container weld seam 11 has a polygonal cross-sectional area. Furthermore, there is an additional rib 61 which serves as retention means for component shrinkage. In this case, this retention means for component shrinkage is formed on both flanges. This weld connection produced using the method according to the invention also enables very high pressures in a corresponding container or a corresponding line to be absorbed.

Likewise in contrast to FIG. 10a, the pegs 14 are not arranged essentially perpendicular to the equator plane of the circumferential weld seam 11 or the circumferential flanges 7/8. Instead the pegs 14 here are formed such that they are each formed from two oppositely arranged grooves, which are provided radially outwardly in the flange surface. The pegs arranged in this way likewise lead to the contribution of a form fit, can likewise be used to ensure the quality of the connection, and the openings provided for them can furthermore also be simultaneously used as an injection point.

Figure 12:
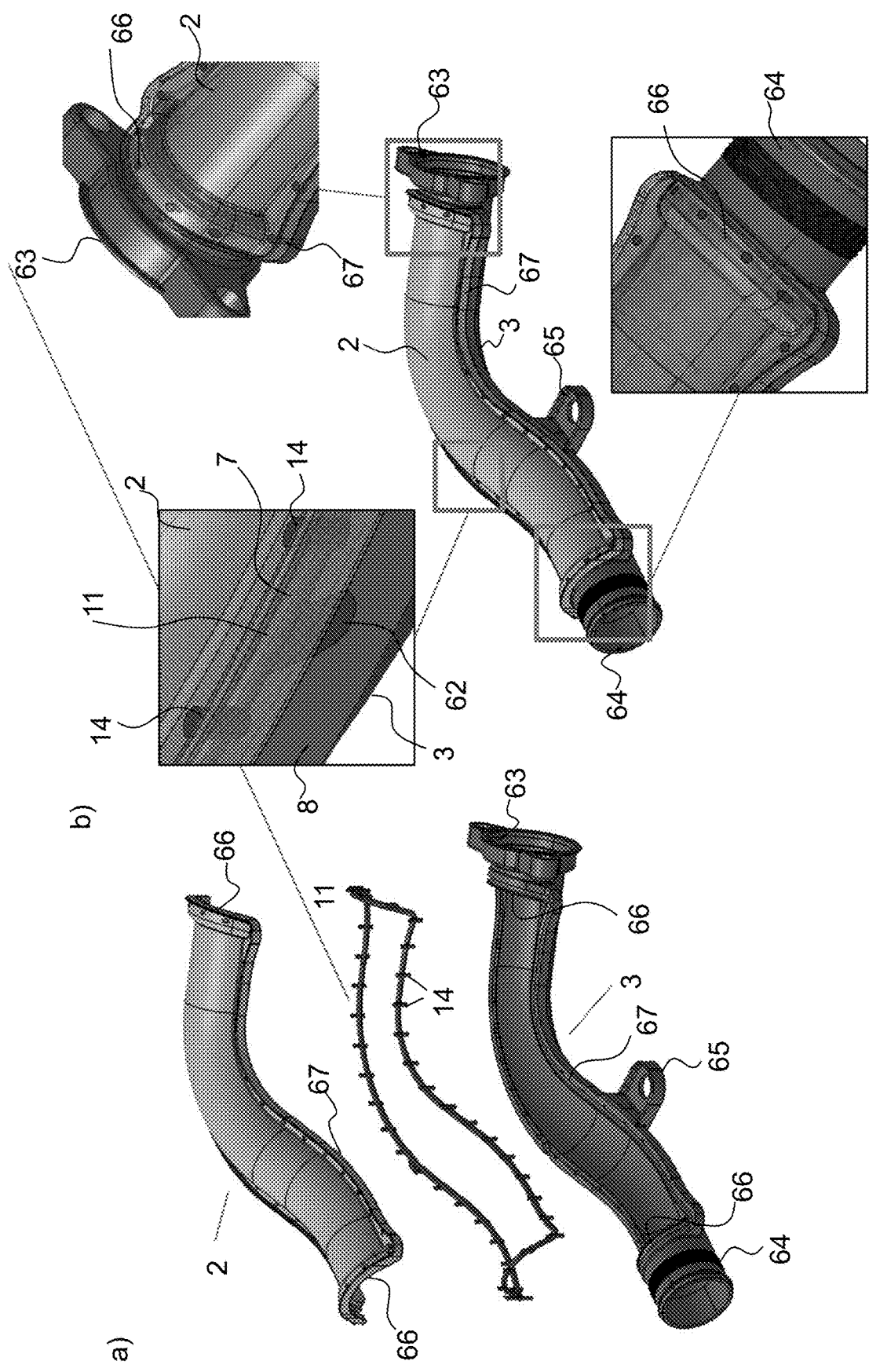
FIG. 12 an illustration of a possible charge air pipe with such a weld seam, showing in a) an exploded illustration and in b) a perspective view with 3 different detail illustrations of the two end regions and the weld seam region.

In general, the injection point is preferably arranged externally along the connecting lines of the two bottle or the wall portions adjoining one another edge to edge; this will also be returned to in particular in association with FIG. 12.

A further alternative design of such a weld connection is illustrated in FIG. 10c. Here, the actual container weld seam 11 is primarily arranged in that region in which the corresponding walls of the upper shell 2 and lower shell 3 adjoin one another edge to edge. The labyrinth seal 21 is then arranged in the flange region, which likewise protrudes quite far here.

In this case, the pegs 14 are also formed by a series of preferentially uniformly spaced holes in the respective flange 7/8 which are distributed over the circumference of the weld connection. In this case, there are also webs 61 as retention means for component shrinkage. This construction is, in particular, also particularly stable with regard to a torque load when a torque 60 is applied, as illustrated schematically in FIG. 10a.

Figure 11:
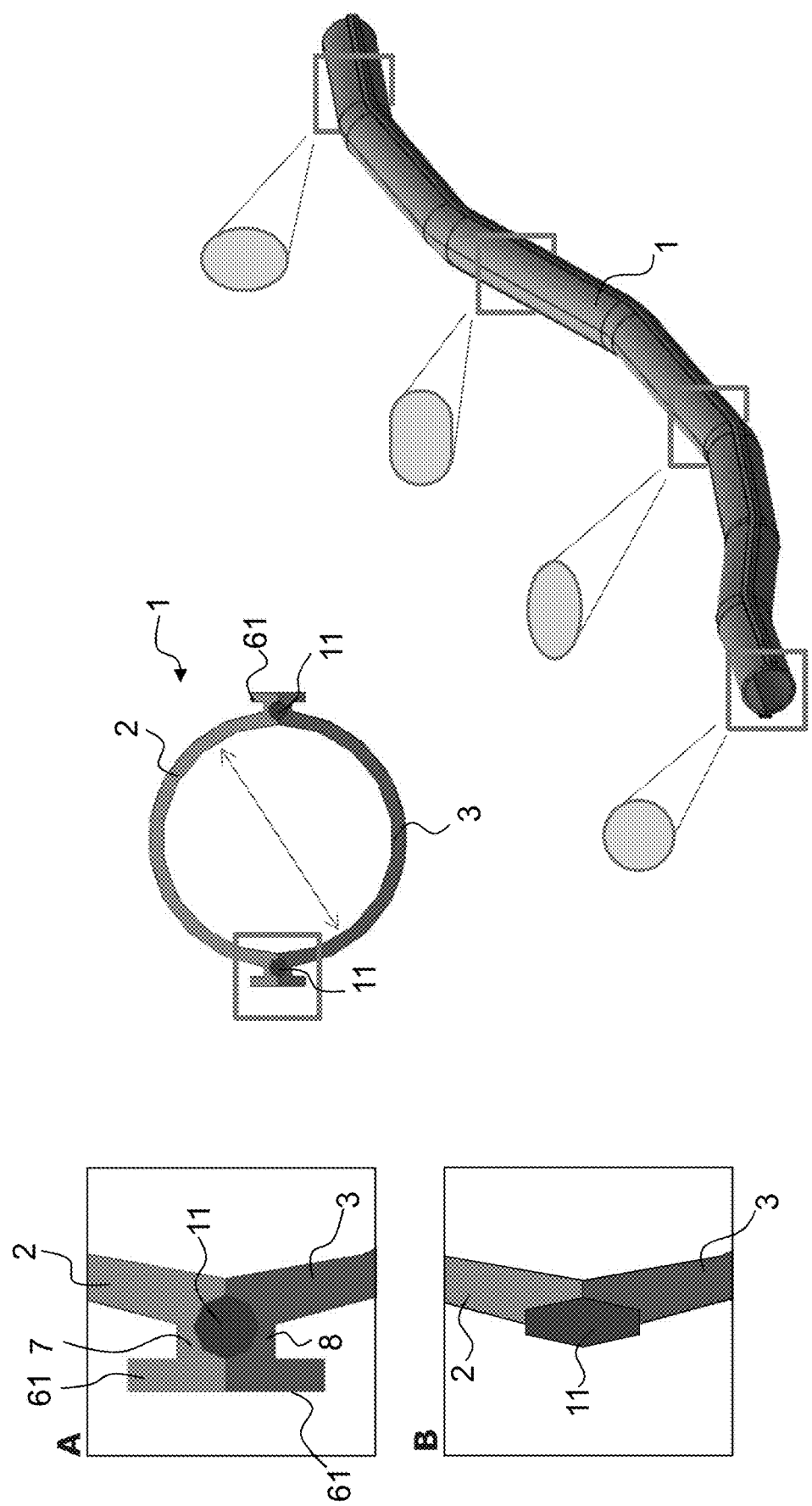
FIG. 11 an illustration of a tubular container (fill pipe) with a varying cross-section over the extent, showing, in sections A and B, various possible configurations of the container connection, in A the option with an outer flange without a labyrinth seal and in B the option of a connection completely without a flange on the upper shell or lower shell.

A container in the form of a fill pipe is illustrated in FIG. 11. With the aid of the proposed method, it is readily possible to also form very complex variable cross-sectional shapes over the extent of such a line or such a pipe, as can be seen from the cross-sectional areas illustrated in four different cross-sectional positions. This takes place without compromising on the strength of the corresponding weld connection and, in particular, without requiring various parts to be connected to one another after being produced separately, and without significant problems occurring during the production of the respective half shells. The actual edge region design and the design of the weld seam here are realized similarly, as was discussed in association with FIG. 10b and as is also illustrated in Option A on the top left in FIG. 11. However, as illustrated on the bottom left under Option B, it is also alternatively possible to dispense with a flange completely in such a connection and to essentially injection mold the weld seam laterally on the outer side. To enable this, in a method as already described above, the molds have to be configured variably by means of corresponding slides so that the necessary outer contour is already established and produced in the first production step of the half shells and a circumferentially closed cavity for forming the container weld seam 11 is nevertheless ensured in the subsequent connecting step.

In FIG. 12, it is shown how such a weld seam 11 can also be used for example in a charge air pipe. It can likewise be seen that, instead of essentially designing the actual weld seam as a circumferential connection or, as in the case of the pipe according to FIG. 11 for example, as an equatorial connection extending circumferentially up to the corresponding inlet or outlet openings, it is also a possible option to design the upper shell 2 partially with an equatorial weld seam region 67—the lower shell 3 then has the corresponding counter region—and then to also provide non-equatorial weld seam regions 66 extending essentially around the axis of the line. Such a design has the advantage that the respective end pieces—the insertion region 64 and the connection flange 63 here—can be manufactured in an injection molding procedure during the production of the lower part. This can be advantageous, for example, if particular loads or particular requirements in terms of shaping are established in these regions. The actual weld seam then essentially has arcuate regions, which are present in the non-equatorial weld seam region 66. The weld seam connections 11 also have pegs 14 here, which are formed in both directions and are distributed over the entire extent of the weld seam 11.

As can be seen with reference to FIG. 12b, an injection opening for the weld seam material 62 is provided on the outer connecting edge. This injection opening is aligned at an angle to the direction of extent of the weld seam 1 there in order to best facilitate the flow into the corresponding cavity. This injection point for the weld seam material is simply provided here as a channel-like depression in one of the two flanges, although it is also possible to also provide an appropriate corresponding depression in the upper flange so that a greater cross-sectional area can then be provided.

Figure 13:
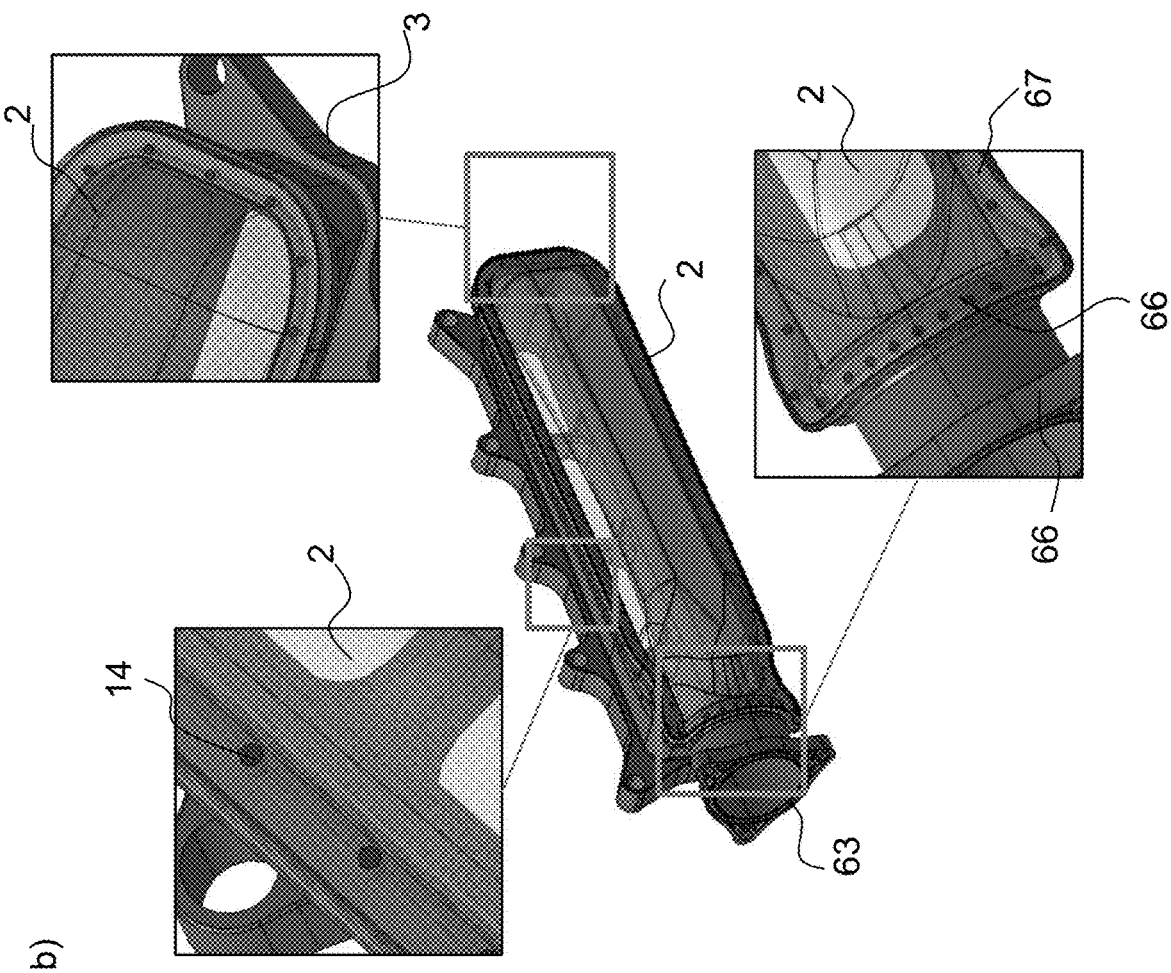
FIG. 13 an illustration of a possible intake pipe, showing in a) an exploded illustration and in b) a perspective view with 3 different illustrations of various regions.
Figure 13:
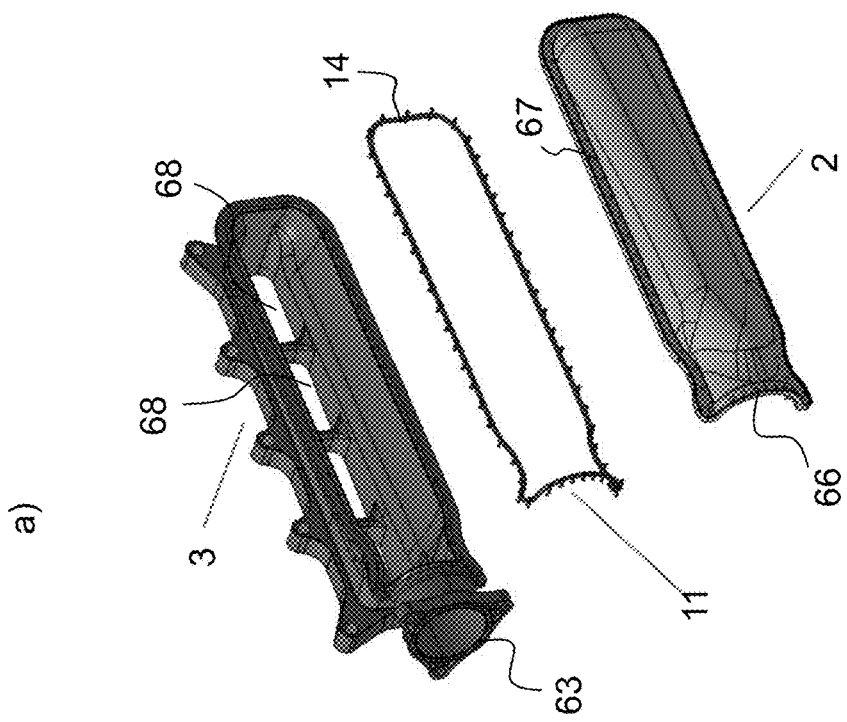

The weld seam connection proposed here can also be used in association with other containers, as illustrated here in FIG. 13 in the case of an intake pipe. This intake pipe has a connection flange 63 and flow openings 68 in the lower part. The upper part 23 is essentially formed in the manner of a cover, which then in turn has an equatorial weld seam region 67 and a non-equatorial weld seam region 66. Pegs 14 are in turn provided circumferentially so that it is possible to ensure the above-mentioned quality control and partial support via form fit.

Figure 14:
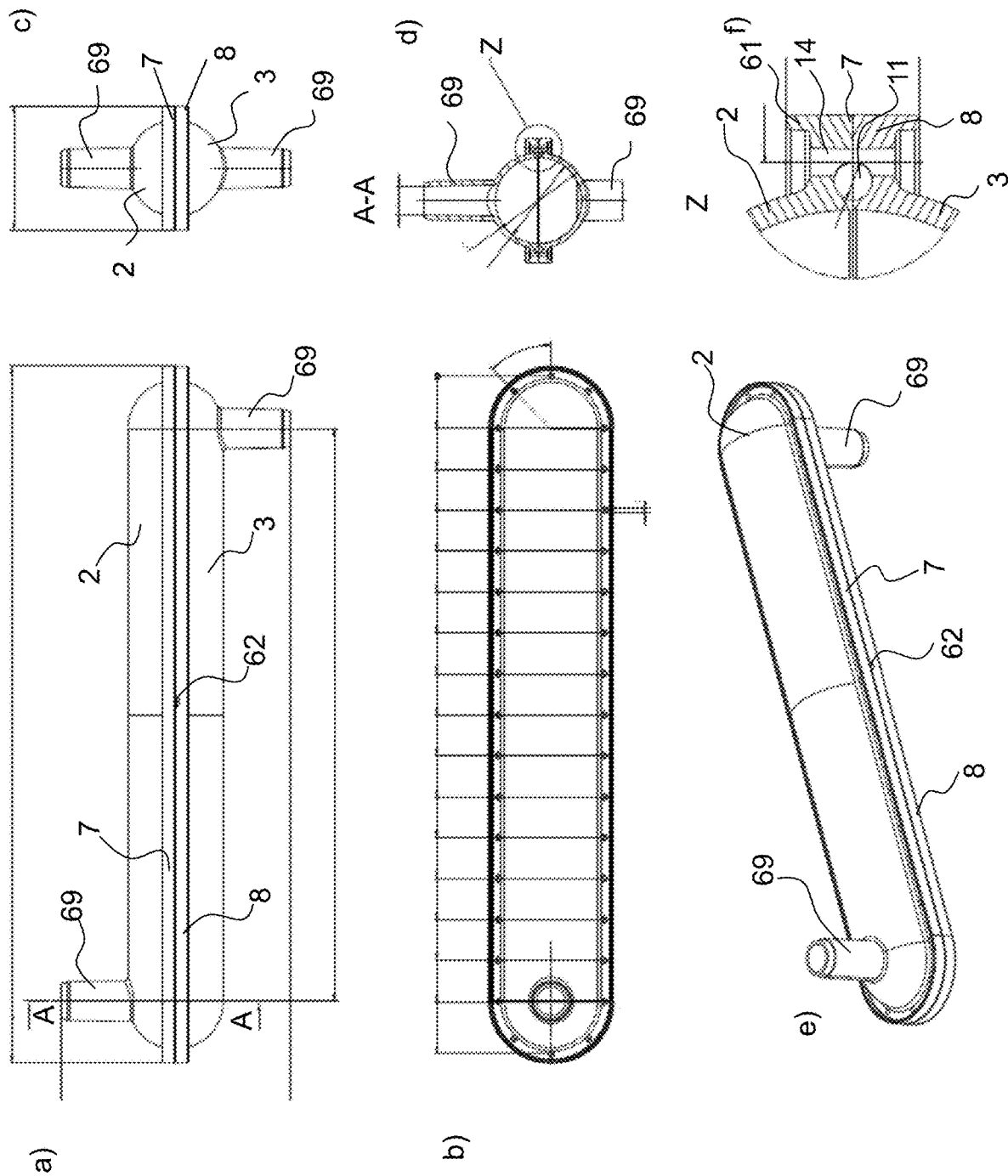
FIG. 14 a further container in different views, in a) in a side view, in b) in a plan view, in c) in a front view, in d) in a section along A-A according to figure a), in e) in a perspective view and in f) the detail according to Z in figure d)

In FIG. 14, a further container in the manner of a through-flow storage container is illustrated with two oppositely arranged connection pieces. In this case, the two half shells are formed virtually identically, which then also entails certain simplifications in terms of the shape. It is therefore possible to dispense with the stepped form of the mold in this case. The design of the flange region and the weld seam 11, c.f. FIG. 14f), is analogous to that which was illustrated in FIG. 10b) and was already discussed in association therewith.

Figure 15:
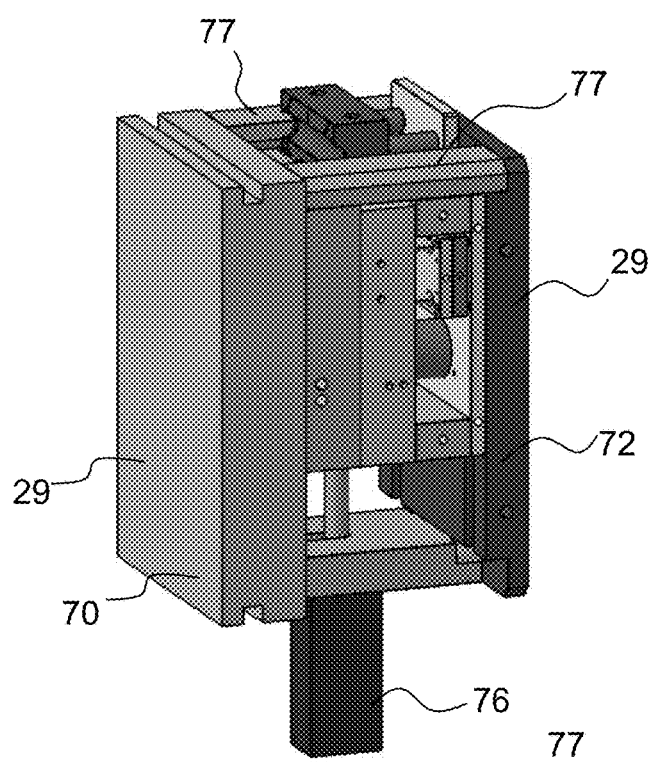
FIG. 15 a production mold for a container according to FIG. 14, showing in a) the closed position during the production step of the individual half shells, in b) the open mold in an exploded illustration, an upper shell and lower shell in the space between the two molds, and in c) a sectional illustration of the closed position according to figure a).
Figure 15:
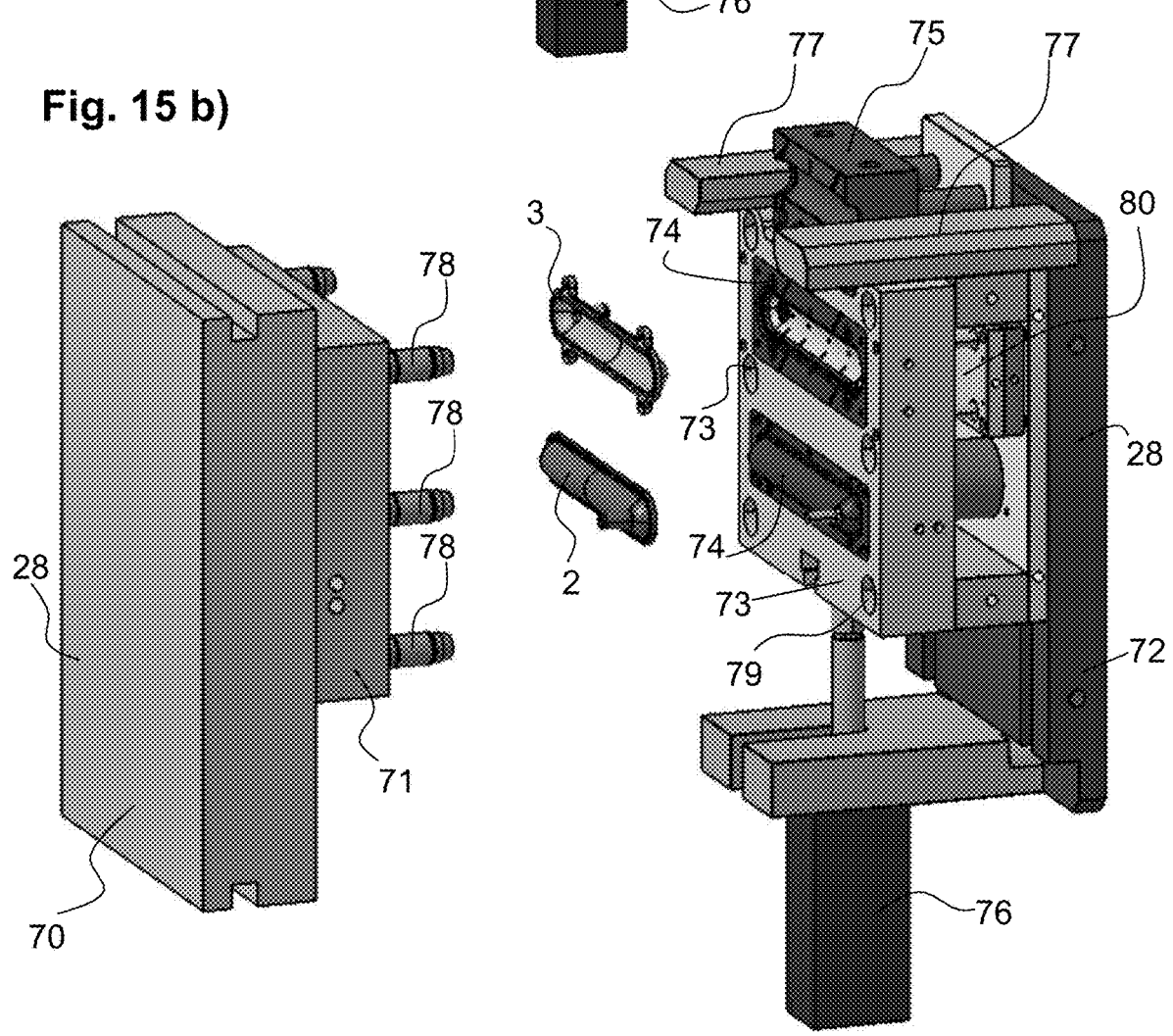
Figure 15:
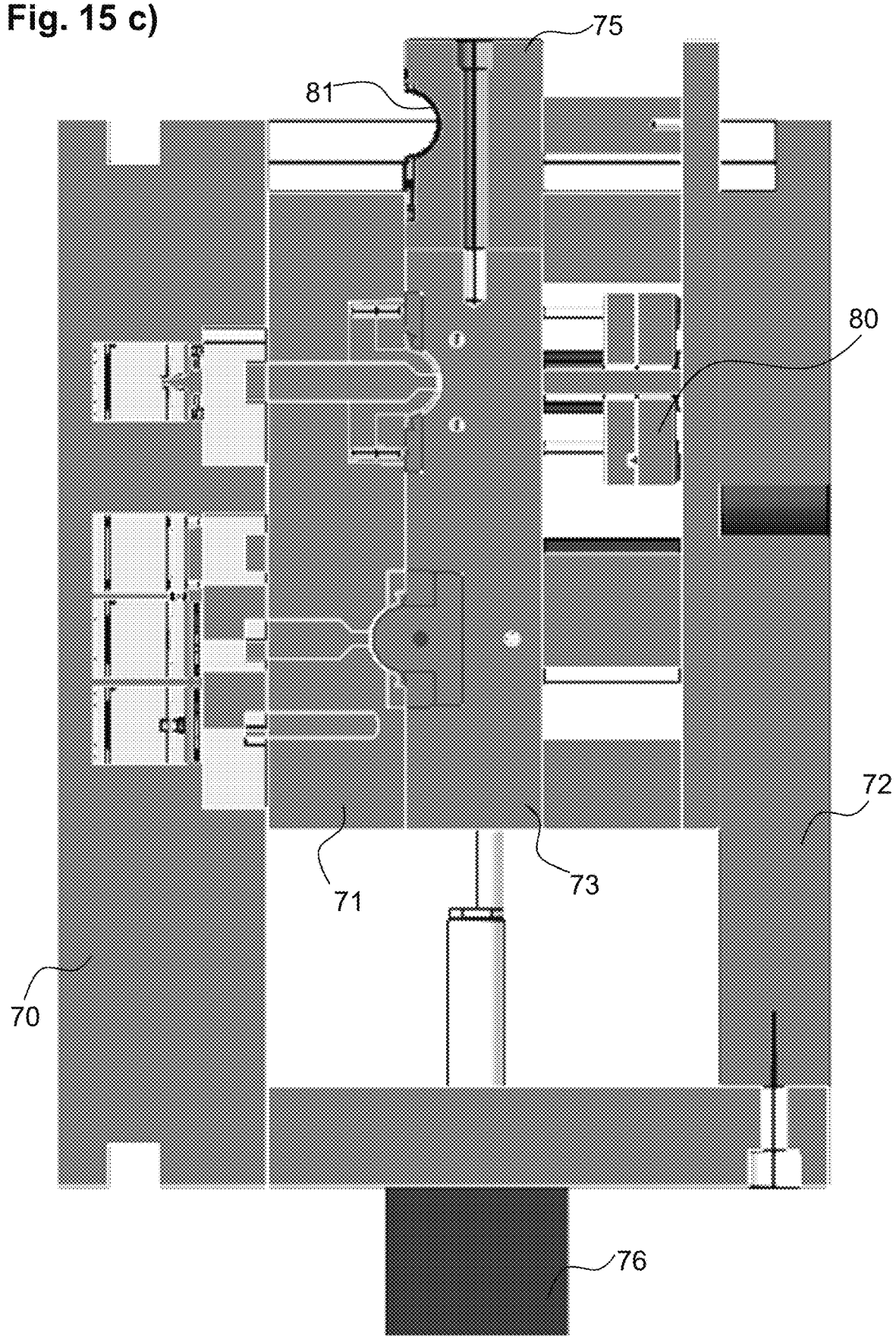

A possible mold for producing such a container body according to FIG. 14 is illustrated in FIG. 15. In contrast to the mold described further above, one of the two molds is displaced between the two positions here, instead of being rotated. Specifically, the upper shell 2 and the lower shell 2 are produced simultaneously in the closed mold, as illustrated in FIG. 15a. The mold is subsequently opened, whereupon care is taken to ensure that the lower shell 3 remains in the cavity of the core side 29, and the upper shell 2 remains in the cavity of the nozzle side 28. When the opening is sufficient for the guide pegs 78 to be withdrawn from the guide openings 79, the core side 74 is subsequently displaced downwards by the distance between the two mold inserts via a hydraulic cylinder 76.

The upper shell 2 formed in the first step now lies directly opposite the lower shell 3 formed in the first step and the flange regions adjoin one another, wherein a cavity for the weld seam 11 is formed, as can best be seen in FIG. 14f. In the next step, the material for the weld seam 11 is now injected into this cavity through the injection opening 62 illustrated in FIG. 14a and thereby forms the weld seam 11 on the one hand and the plurality of pegs 14 on the other. The mold is subsequently opened again and, for example, the component is ejected from the core side via an ejector system 80.

To enable the required molding pressure to be exerted on the molds in both positions without tilting moments occurring, tool supports 77 are advantageously provided, as well as the guide pegs 78 already mentioned above and the corresponding guide openings 79.

Owing to the corresponding arrangement of a plurality of such guide pegs 78 and corresponding openings 79, it is possible to be able to ensure both optimum guidance and optimum support, also via the tool support columns 77, in both production positions. To enable the forces to be absorbed, it is furthermore advantageous if an auxiliary cavity 75 is arranged on the core side. This auxiliary cavity 75 has a complementary mold 81 which, in the second production step, comes into contact with the nozzle-side mold for the first step for the lower shell.

The containers according to FIG. 14 were subjected to a bursting strength test with a glycol/water mix at room temperature. In this case, bursting pressures in the range of 17-bar, were reached, which shows how excellent the formed weld seam is. The required pressure values for the corresponding products are typically substantially low, notably ca. 6.0 to 7.0 bar. Both in the case of the outer weld seam geometry and, in particular, in the case of the inner weld seam geometry, the values obtained are therefore considerably higher than the usual maximum values of 6.0 to 7.0 bar for such products.

| | LIST OF REFERENCE SIGNS |
|---|---|
| 1 | Container |
| 2 | Upper shell of 1 |
| 3 | Lower shell of 1 |
| 4 | Depressed region von 3 |
| 5 | Dosing unit |
| 6 | Adapter plate |
| 7 | Flange on 2 |
| 8 | Flange on 3 |
| 9 | Baffle |
| 10 | Holes in 9 |
| 11 | Container weld seam |
| 12 | Circumferential rib of 5 |
| 13 | Hole in 6 |
| 14 | Peg on 11 |
| 15 | Hole in the base of 4 |
| 16 | Regions of 5 projecting into the container |
| 17 | Top surface of 2 |
| 18 | Circumferential wall of 2 |
| 19 | Bottom surface of 3 |
| 20 | Circumferential wall of 3 |
| 21 | Mechanical Labyrinth-Seal |
| 22 | Ridge on 8 |
| 23 | Groove in 7 |
| 24 | Circumferential channel in 8 |
| 25 | Circumferential channel in 7 |
| 26 | Outer contact region between 7 and 8 |
| 27 | Inner contact region between 7 und 8 |
| 28 | Nozzle-side mold |
| 29 | Core-side mold |
| 30 | Production machine nozzle-side, clamping plate |
| 31 | Production machine core side, clamping plate |
| 32 | Rotary plate for 29 |
| 33 | Rotation of 29 |
| 34 | Cavity for 2 |
| 35 | Cavity for 3 |

-continued

LIST OF REFERENCE SIGNS

| | |
|---|---|
| 36 | Delimiting contour of 34 on 29 |
| 37 | Delimiting contour of 34 on 28 |
| 38 | Delimiting contour of 35 on 29 |
| 39 | Delimiting contour of 35 on 28 |
| 40 | Pin ejector |
| 41 | Lifting segment |
| 42 | Angled slide |
| 43 | Injection-molding material feed for 2 to 34 in 28 |
| 44 | Injection-molding material feed for 11 in 28 |
| 45 | Injection-molding material feed for 3 to 35 in 28 |
| 46 | Region of 34 for 9 |
| 47 | Parting plane/closure plane of region for upper shell of 28 |
| 48 | Parting plane/closure plane of region for lower shell of 28 |
| 49 | Cavity formed between 7 and 8 through 24 and 25 for 11 |
| 50 | Enclosed cavity of 1 |
| 51 | Upper edge of 12 |
| 52 | Lower side of 13 |
| 53 | Edge taper of 13 |
| 54 | Overmolded region |
| 55 | Weld seam |
| 56 | Parting plane between 2 and 3 |
| 57 | Closing direction |
| 58 | Support, extension |
| 59 | Contact surface of 58 |
| 60 | Torque load |
| 61 | Retention means Component shrinkage |
| 62 | Injection opening for weld seam material |
| 63 | Connecting flange |
| 64 | Insertion region |
| 65 | Holding tongue |
| 66 | Non-equatorial weld seam region |
| 67 | Equatorial weld seam region |
| 68 | Flow openings in 3 |
| 69 | Connecting piece |
| 70 | Clamping plate, nozzle side |
| 71 | Molding plate, nozzle side |
| 72 | Clamping plate, core side |
| 73 | Molding plate, core side |
| 74 | Mold inserts, core side |
| 75 | Auxiliary cavity, core side |
| 76 | Hydraulic cylinder, core side |
| 77 | Tool support |
| 78 | Guide pegs on 71 |
| 79 | Guide openings in 73 |
| 80 | Ejector system, core side |
| 81 | Complementary mold of 75 |
| 4.1 | Tool closed |
| 4.2 | Injection 01, Upper shell/lower shell |
| 4.3 | Tool open |
| 4.4 | Rotate open tool with injection molded shells +180° |
| 4.5 | Close tool with injection molded shells |
| 4.6 | Injection 02, weld seam |
| 4.7 | Cooling time, tool closed |
| 4.8 | Tool open |
| 4.9 | Remove tool from mold |
| 4.10 | Rotate tool −180° |
| 7.1 | Single component injection molding of 13 from HD-PE |
| 7.2 | Hot seal welding of 13 to 5 |
| 7.3 | Injection 01 according to 4.2, Upper shell and lower shell from HD-PE |
| 7.4 | Change position |
| 7.5 | Injection 02 of 11 from HD-PE |
| l | Length of 1 |
| b | Width of 1 |
| h | Height of 1 |

The invention claimed is:

1. A method for producing a container for carrying or storing gases or liquids which is made from a thermoplastic plastics material, wherein the method has the following step sequence:

in an injection mold having a first mold and a second mold, which, in a first injection molding position, together provides at least one cavity for an upper shell of said container as well as at least one cavity for a lower shell of said container, at least one upper shell and at least one lower shell are produced in parallel in an injection molding method;

opening the injection mold, wherein the at least one upper shell remains in the first mold and the at least one lower shell remains in the second mold;

at least one of rotating or displacing at least one of the two molds so that, after the rotation or displacement, the concave inner sides of the shells are directed towards one another and closing the mold to realize a second injection molding position, so that substantially congruent edge regions of the shells come into at least partial planar contact;

injecting injection molding material into a cavity between or adjoining the edge regions to form a circumferential weld seam between the upper shell and lower shell and to form said container; and opening the injection mold and removing the at least one container;

wherein the position of the first mold relative to the second mold, as seen in a closing direction, is arranged at a different height in the first injection molding position than in the second injection molding position.

2. The method as claimed in claim 1, wherein the step sequence is followed by the following step:

at least one of rotating or displacing at least one of the two molds so that a first injection molding position is in turn assumed, which provides at least one cavity for an upper shell and at least one cavity for a lower shell, and cyclically repeating the step sequence to produce a plurality of containers.

3. The method as claimed in claim 1,

Wherein a closing force in the range of 300-3000 t is built up both in the first injection molding position and in the second injection molding position.

4. The method as claimed in claim 1, wherein the upper shell and lower shell each have a concave inner side and a convex outer side, and in that the edge regions have a outwardly or inwardly directed flange, and wherein, in a contact surface of at least one of the flanges, or both flanges, which faces the other flange in each case, or mutually abutting wall regions adjoining the flanges, a circumferential channel is provided so that, when the flanges or wall regions of the upper shell and lower shell are in planar contact, a cavity is formed into which thermoplastic plastics material is injected in the second injection molding position to form the weld seam.

5. The method as claimed in claim 4, wherein the edge regions have a circumferential flange, and wherein, in the contact surface of at least one or both of the flanges, which faces the other flange in each case, or the mutually abutting wall regions adjoining the flanges, a circumferential channel is provided so that, when the flanges or wall regions of the upper shell and lower shell are in planar contact, a cavity is formed into which thermoplastic plastics material is injected in the second injection molding position to form the weld seam.

6. The method as claimed in claim 1, wherein at least one of the molds is formed such that baffles projecting into the interior of the container are formed.

7. The method as claimed in claim 6, wherein a protruding contour is formed on at least one angled slide and, for releasing the formed container, an angled slide is displaced laterally to release a depression generated by the contour, or a hole generated by the contour, in the injection molded component.

8. The method as claimed in claim 1, wherein a further structural element is connected to the container after the production of the container.

9. The method as claimed in claim 8, wherein, after previously fastening an adapter plate to a dosing unit, the dosing unit is placed in the mold before the first injection molding position is assumed and, when forming a corresponding half shell, the dosing unit is overmolded with the material of the half shell to form a tight connection between the dosing unit and half shell or the adapter plate and half shell.

10. The method as claimed in claim 1, wherein the thermoplastic material of at least one of the shells or the weld seam, is a polyolefin material.

11. The method as claimed in claim 1, wherein, when opening the injection mold after the production of the two shells, the at least one upper shell remains in the first mold and the at least one lower shell remains in the second mold.

12. The method as claimed in claim 1, wherein the step sequence is followed by the following step:
at least one of rotating or displacing at least one of the two molds so that a first injection molding position is in turn assumed, which provides at least one cavity for an upper shell and at least one cavity for a lower shell, and cyclically repeating the step sequence to produce a plurality of containers,
wherein the injection mold is designed for simultaneous production of a container and the rotation of one of the two molds takes place through 180°, or the injection mold is designed for simultaneous production of n containers and the rotation of one of the two molds takes place through an angle of 360°/2n.

13. The method as claimed in claim 1, wherein a closing force in the range of 400-2000 t, is built up both in the first injection molding position and in the second injection molding position.

14. The method as claimed in claim 1, wherein the upper shell and lower shell each have a concave inner side and a convex outer side, and in that the edge regions have a circumferential, outwardly directed flange, and wherein, in a contact surface of at least one of the flanges, or both flanges, which faces the other flange in each case, or the mutually abutting wall regions adjoining the flanges, a circumferential channel is provided so that, when the flanges or wall regions of the upper shell and lower shell are in planar contact, a cavity is formed into which thermoplastic plastics material is injected in the second injection molding position to form the weld seam.

15. The method as claimed in claim 5, wherein the at least one channel, or both channels, have a substantially semi-circular, semi-elliptical, polygonal, rectangular, triangular or trapezoidal cross-section,
or wherein at least one recess or hole, or a plurality of recesses and/or holes which are distributed over the circumference, is provided in at least one of the flanges, or in both flanges, so that a weld seam having at least one peg is formed, wherein the recesses or holes can be formed radially outwardly between the flanges or such that they pass through the respective flange.

16. The method as claimed in claim 1, wherein at least one of the molds is formed such that baffles projecting into the interior of the container are formed, wherein these baffles have holes which are realized via at least one angled slide in at least one of the molds.

17. The method as claimed in claim 1, wherein a further structural element, in the form of a dosing unit or a seal, is connected to the container after the production of the container, or during the production of the container, wherein this connection takes place via an adapter plate.

18. The method as claimed in claim 1, wherein the thermoplastic material of at least one of the shells or the weld seam, the thermoplastic material of the two shells and the weld seam, is a polyolefin material with a high density of at least 0.94 g/cm3, or HD-PE or PP, in a glass-fiber reinforced or non-reinforced form.

19. The method as claimed in claim 1, wherein, when opening the injection mold after the production of the two shells, the at least one upper shell remains in the first mold and the at least one lower shell remains in the second mold, in a respective concave mold contour which forms the outer side of a respective half shell, and wherein ejectors and/or undercuts are used to ensure that the respective shell remains in the corresponding mold.

* * * * *